United States Patent
Wu et al.

(10) Patent No.: US 12,503,346 B1
(45) Date of Patent: Dec. 23, 2025

(54) METHOD FOR DETERMINING ALIGNMENT STATE, CONTROLLER, AND MATERIAL HANDLING EQUIPMENT

(71) Applicant: VisionNav Robotics USA Inc., Acworth, GA (US)

(72) Inventors: Tingwei Wu, Acworth, GA (US); Bingchuan Yang, Acworth, GA (US); Yongxian Zeng, Acworth, GA (US)

(73) Assignee: VisionNav Robotics USA Inc., Acworth, GA (US)

( * ) Notice: Subject to any disclaimer, the term of this patent is extended or adjusted under 35 U.S.C. 154(b) by 0 days.

(21) Appl. No.: 19/095,310

(22) Filed: Mar. 31, 2025

(30) Foreign Application Priority Data

Jan. 27, 2025 (CN) .......................... 202510126378.4

(51) Int. Cl.
  *B66F 9/075* (2006.01)
  *B66F 9/06* (2006.01)
  *G01S 13/89* (2006.01)

(52) U.S. Cl.
  CPC ............ *B66F 9/0755* (2013.01); *B66F 9/063* (2013.01); *G01S 13/89* (2013.01)

(58) Field of Classification Search
  CPC ......... B66F 9/0755; B66F 9/063; G01S 13/89
  See application file for complete search history.

(56) References Cited

U.S. PATENT DOCUMENTS

| 2022/0332524 | A1* | 10/2022 | Matsuoka | B25J 15/0052 |
| 2023/0406681 | A1* | 12/2023 | Wu | G01S 17/89 |
| 2024/0017417 | A1* | 1/2024 | Ye | H04N 23/54 |

(Continued)

FOREIGN PATENT DOCUMENTS

| CN | 115123839 B | 12/2022 |
| CN | 115790447 A | 3/2023 |

(Continued)

OTHER PUBLICATIONS

Blanch et al, X. Point Cloud Stacking: A Workflow to Enhance 3D Monitoring Capabilities Using Time-Lapse Cameras, Google Scholar, MDPI, Remote Sensing, Apr. 2020, pp. 1-19. (Year: 2020).*

(Continued)

*Primary Examiner* — Russell Frejd
(74) *Attorney, Agent, or Firm* — Westbridge IP LLC

(57) ABSTRACT

A method for determining an alignment state includes: acquiring, by using a sensor, target point clouds of a first and second stacking object; extracting, from the target point clouds, a first point cloud of a first target region of the first stacking object and a second point cloud of a second target region of the second stacking object; matching the first point cloud with a first template point cloud, to obtain a pose of the first stacking object, and matching the second point cloud with a second template point cloud, to obtain a pose of the second stacking object; and determining a difference between the poses of the first and second stacking object, and comparing the difference with a threshold, to determine an alignment state between the first and second stacking object. The present disclosure is used to implement alignment between a first and second stacking object during stacking.

19 Claims, 10 Drawing Sheets

(56) References Cited

U.S. PATENT DOCUMENTS

2024/0173866 A1* 5/2024 Kanunikov ............ B65G 61/00

FOREIGN PATENT DOCUMENTS

| CN | 117037268 A | * | 11/2023 | ............ G06N 3/0455 |
| CN | 118495403 A | * | 8/2024 | ............ B66F 9/0755 |

OTHER PUBLICATIONS

Zhuang et al, C. Instance segmentation based 6D pose estimation of industrial objects using point clouds for robotic bin picking, Google Scholar, Elsevier, Robotics and Computer-Integrated Manfacturing, Feb. 2023, pp. 1-18. (Year: 2023).*

Ru et al, C. Material location and stacking detection method based on LIDAR and camera fusion, Google Scholar, 2023 IEEE International Conference on Image Processing and Computer Applications (ICIPCA), Aug. 2023, pp. 717-724. (Year: 2023).*

* cited by examiner

METHOD FOR DETERMINING ALIGNMENT STATE, CONTROLLER, AND MATERIAL HANDLING EQUIPMENT

CROSS-REFERENCE TO RELATED APPLICATIONS

The present application claims priority to Chinese Patent Application No. 202510126378.4, filed on Jan. 27, 2025, which is hereby incorporated by reference in its entirety.

TECHNICAL FIELD

The present disclosure relates to the field of warehousing and logistics and machine vision technologies, and in particular, to a method for determining an alignment state, a controller, and material handling equipment.

BACKGROUND

A system that uses material handling equipment such as an Automated Guided Vehicle (AGV) during operation has advantages such as being highly unmanned, automated, and intelligent, which improves production efficiency and an operational level in industries such as warehousing, manufacturing, and logistics. In a typical scenario, material handling equipment is often responsible for moving various goods, during which stacking of goods is inevitably involved. The goods are usually packed by using a cardboard box or the like, or stored by using a material cage, a wooden box, a plastic box, or the like.

In consideration of space utilization, stacking objects such as cardboard boxes, material cages, and wooden boxes that are loaded with goods may be stacked in a process of moving the goods by the material handling equipment. In view of stability, the material handling equipment is required to accurately stack one stacking object onto another stacking object. In this process, if the two stacking objects cannot be aligned, operation safety may be affected.

SUMMARY

The present disclosure provides a method for determining an alignment state, a controller, and material handling equipment, to control a first stacking object and a second stacking object to be aligned with each other during stacking.

According to a first aspect, a method for determining an alignment state is provided, where the method includes: acquiring, by a controller by using a sensor, target point clouds of a first stacking object and a second stacking object; extracting, by the controller from the target point clouds, a first point cloud of a first target region of the first stacking object and a second point cloud of a second target region of the second stacking object; matching, by the controller, the first point cloud with a first template point cloud, to obtain a pose of the first stacking object, and matching, by the controller, the second point cloud with a second template point cloud, to obtain a pose of the second stacking object; and determining, by the controller, a difference between the pose of the first stacking object and the pose of the second stacking object, and comparing, by the controller, the difference with a threshold, to determine an alignment state between the first stacking object and the second stacking object.

According to a second aspect, a controller is provided, where the controller is configured to execute program instructions, to implement any method according to the first aspect.

According to a third aspect, material handling equipment is provided, including a controller, where the controller is configured to execute program instructions, to implement any method according to the first aspect.

BRIEF DESCRIPTION OF THE DRAWINGS

To describe the technical solutions in embodiments of the present disclosure or in the conventional technology more clearly, the following briefly describes the accompanying drawings required for describing the embodiments. Apparently, the accompanying drawings in the following descriptions only show some embodiments of the present disclosure, and a person of ordinary skill in the art may still derive other drawings from these accompanying drawings without creative efforts.

DETAILED DESCRIPTION OF THE EMBODIMENTS

The following clearly and completely describes the technical solutions in embodiments of the present disclosure with reference to the accompanying drawings in embodiments of the present disclosure. Apparently, the described embodiments are merely some but not all of embodiments of the present disclosure. All other embodiments obtained by persons of ordinary skill in the art based on embodiments of the present disclosure shall fall within the protection scope of the present disclosure.

Terms used in embodiments of the present disclosure are merely intended to describe particular embodiments but are not intended to limit the present disclosure. The singular forms of "a/an", "said", and "the" used in embodiments of the present disclosure and the appended claims are also intended to include plural forms, unless the context clearly implies otherwise.

It should be understood that, the term "and/or" used in this specification is merely an association relationship that describes associated objects, and represents that there may be three relationships. For example, A and/or B may represent three cases: only A exists, both A and B exist, and only B exists. In addition, the character "/" in this specification generally indicates an "or" relationship between the associated objects before and after. In addition, the term "based on" used in this specification is not limited to being based on an object only. For example, determining B based on A may indicate: determining B based on A only, or determining B partially based on A.

In a related technology, stacking is performed on an upper stacking object and a lower stacking object based on a pose of the lower stacking object relative to material handling equipment, and impacts of factors such as an inaccurate pickup pose of the upper stacking object, uneven ground, a cumulative error of an odometer, and an error of the material handling equipment are not considered. As a result, the upper stacking object and the lower stacking object are not aligned during stacking, which affects operation safety.

Figure 1:
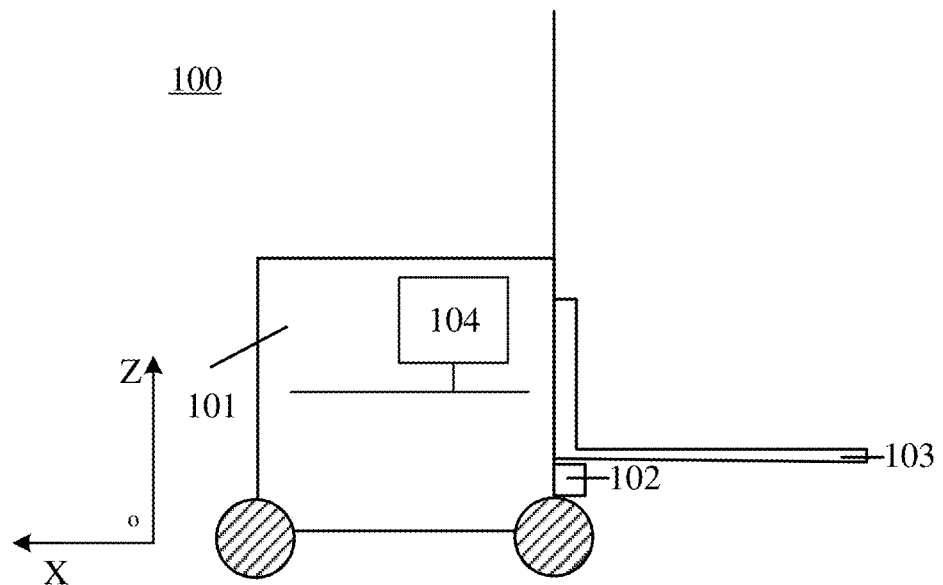
FIG. 1 is a schematic diagram of a system for material handling equipment to which embodiments of the present disclosure are applicable.

In view of this, the present disclosure provides a new idea. To facilitate understanding of the present disclosure, the following first describes a schematic diagram of a system for material handling equipment on which the present disclosure is based. FIG. 1 shows a schematic diagram of a system for an exemplary material handling equipment to which embodiments of the present disclosure may be applied. As shown in FIG. 1, the material handling equipment 100 includes a material handling equipment body 101, a sensor 102, a stacking execution component 103, and a controller 104. For example, the controller 104 may include a memory and a processor. The memory is used to store program instructions, and the controller is used to execute the program instructions, to implement a method in embodiments of the present disclosure.

At the hardware level, the controller 104 generally includes a processor and a memory. Optionally, the controller 104 may also include input and output interfaces, a mainboard, peripheral circuits and elements. At the software level, the controller 104 generally includes a control algorithm, an operating system, a communication protocol, and so on. The controller 104 in the specification may be referred to as a collection of controllers for performing the same or different tasks.

The material handling equipment 100 in embodiments of the present disclosure refers to a device that may automatically or semi-automatically perform a handling task. The material handling equipment 100 may be an AGF (Automated Guided Forklift), a pallet truck, a crane truck, an AGV (Automated Guided Vehicle), an AMR (Autonomous Mobile Robot), a humanoid robot, or the like. The corresponding stacking execution component 103 may be a fork, a robotic arm, or the like.

The AGF is an intelligent industrial vehicle that integrates a forklift technology and an AGV (Automated Guided Vehicle) technology. The AGF can automatically complete tasks such as material handling and stacking.

The controller 104 is configured to control the stacking execution component 103 of the material handling equipment 100 to execute stacking on a first stacking object and a second stacking object. The controller 104 may be a system or a device on the material handling equipment body 101 that plays a role of computation or control, such as a control mainboard, a control box, a control unit, a vehicle-mounted computer, a computing platform, a tablet computer, or a computer, or a system or a device that plays a role of computation or control in a local server or a cloud server, or may be in another form, such as a handheld controller or a remote controller. This is not limited in embodiments of the present disclosure.

The sensor 102 may be in a form of a sensor module, and at least includes a radar used for collecting point clouds, for example, a Lidar.

The processor is responsible for executing core functions such as calculation, control and decision-making. The processor may receive data from a sensor, run control algorithms, and command an actuator to complete a task. Common processor types may include: a CPU (Central Processing Unit), a DSP (Digital Signal Processor), a MCU (Microcontroller Unit), and so on. The processor in the specification may refer to a collection of processors for performing the same or different tasks.

The memory is configured to store data or a program. The memory in the specification may be referred to as a collection of memories for performing the same or different tasks.

First, concepts involved in embodiments of the present disclosure are described.

Stacking refers to arranging and piling up some objects vertically according to a specific rule.

Stacking object: refers to an object involved in stacking, and may be specifically goods or goods with a simple package such as a wrapping film, or may be a container that may accommodate or carry goods, for example, a material cage, a wooden box, a plastic box, or a pallet.

Stacking process: refers to a process in which material handling equipment lifts a first stacking object to make the first stacking object move close to a second stacking object, adjusts a pose of the material handling equipment to align the first stacking object with the second stacking object, and places the first stacking object onto the second stacking object, to complete stacking.

The first stacking object refers to a stacking object located above (for example, an upper material cage), and the second stacking object refers to a stacking object located below (for example, a lower material cage).

Alignment state: refers to a state in which two or more stacking objects are arranged in a vertical direction, and at least some of border straight lines of a stacking object are parallel to or overlapped with those of another stacking object. The vertical direction refers to a Z-axis direction (for example, the Z-axis in FIG. 1 or the Z-axis in FIG. 2) in a coordinate system of material handling equipment.

Figure 2:
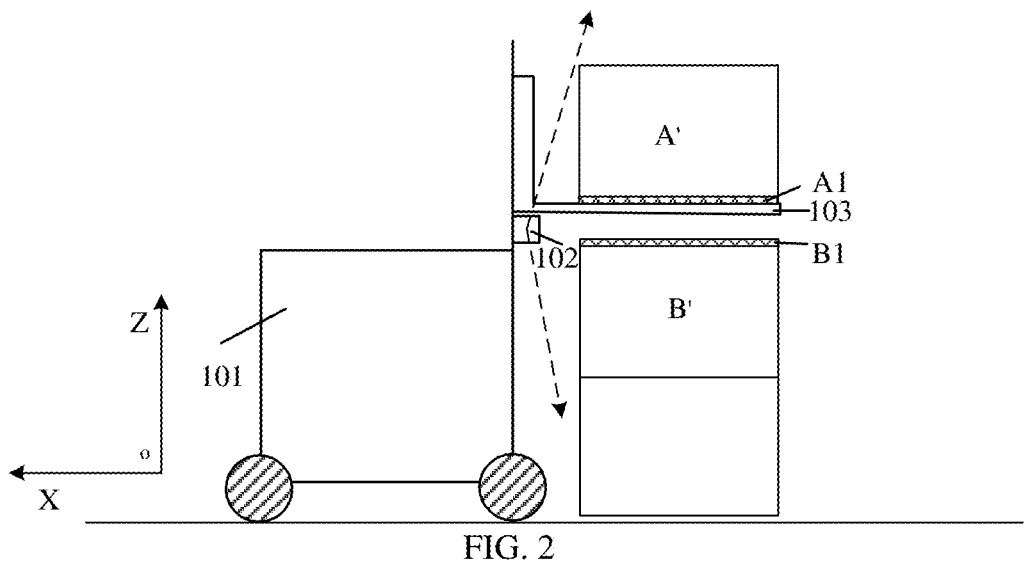
FIG. 2 is a diagram of an application scenario according to an embodiment of the present disclosure.

As shown in FIG. 2, a geometric center point of the material handling equipment may be used as a point O in the coordinate system, and a forward-backward travel direction (that is, a longitudinal direction of the material handling equipment body 101) of the material handling equipment is used as an X-axis, where a positive direction of the X-axis is a direction away from an attachment (for example, a fork) of the material handling equipment, a height direction of the material handling equipment is used as the Z-axis, and a lateral direction of the material handling equipment body 101 is used as a Y-axis, where a positive direction of the Y-axis is perpendicular to the page, pointing outwards.

First point cloud: refers to a point cloud of a first target region of the first stacking object that is acquired by a sensor. The first point cloud is matched with a first template point cloud, to obtain a pose of the first stacking object.

Second point cloud: refers to a point cloud of a second target region of the first stacking object that is acquired by the sensor. The second point cloud is matched with a second template point cloud, to obtain a pose of the second stacking object.

The first stacking object has the first target region (for example, A1 in FIG. 2). The first target region refers to a key structure region on the first stacking object that is in contact with the second stacking object after stacking. The first target region may be a key structure region of the first stacking object, such as a foot cup, a border, or a corner structure.

The second stacking object has the second target region (for example, B1 in FIG. 2). The second target region refers to a key structure region on the second stacking object that is in contact with the first stacking object after stacking. The second target region may be a key structure region such as an upright, a border, or a corner structure region.

A third stacking object has a same structure and a same size as the first stacking object, and has a key structure in contact with a fourth stacking object after stacking. This structure may be a foot cup, a border, a corner structure, or the like of the third stacking object.

A fourth stacking object has a same structure and a same size as the second stacking object, and has a key structure region in contact with the third stacking object after stacking. This structure may be an upright, a border, a corner structure region, or the like of the fourth stacking object.

Target point cloud: refers to point cloud data of a target region that is acquired by the sensor.

Standard point cloud: refers to a point cloud obtained after an original point cloud is processed.

Template point cloud: refers to a pre-defined point cloud model used to compare, register, or identify other point clouds.

The first template point cloud refers to a point cloud that at least includes a part of a key structure region of the third stacking object when the third stacking object and the fourth stacking object are aligned.

The second template point cloud refers to a point cloud that at least includes a part of a key structure region of the fourth stacking object when the third stacking object and the fourth stacking object are aligned.

Figure 3:
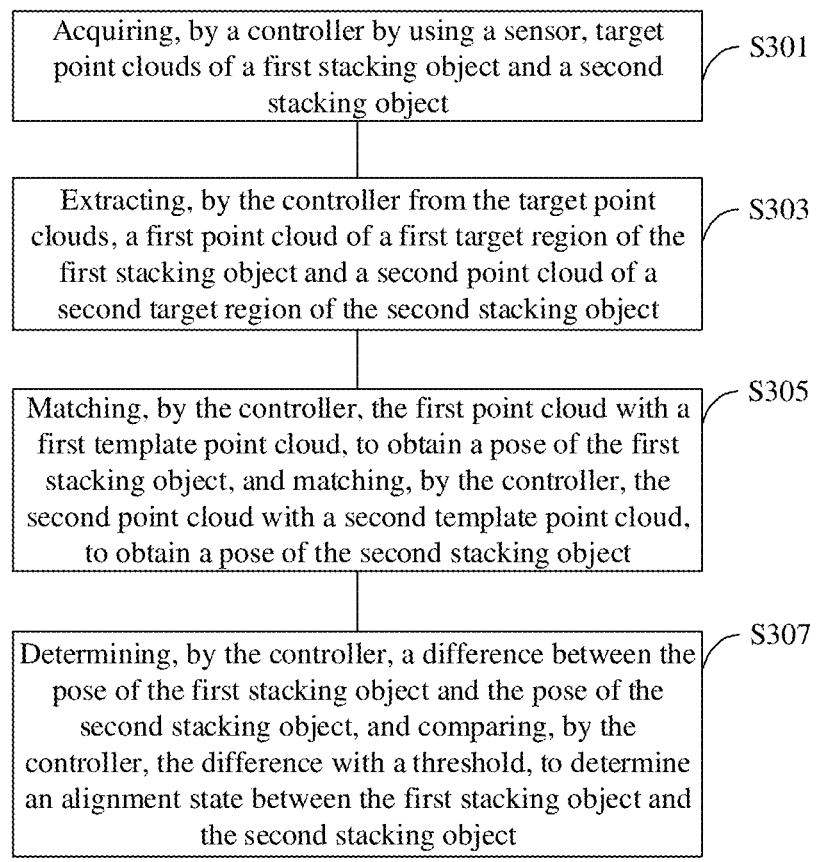
FIG. 3 is a flowchart of a method for determining an alignment state according to an embodiment of the present disclosure.

FIG. 3 is a flowchart of a method for determining an alignment state according to an embodiment of the present disclosure. This method may be executed by the material handling equipment in the system shown in FIG. 1. As shown in FIG. 3, the method may include Step 301 to Step 307.

Step 301: Acquiring, by a controller by using a sensor, target point clouds of a first stacking object and a second stacking object.

Step 303: Extracting, by the controller from the target point clouds, a first point cloud of a first target region of the first stacking object and a second point cloud of a second target region of the second stacking object.

Step 305: Matching, by the controller, the first point cloud with a first template point cloud, to obtain a pose of the first stacking object, and matching, by the controller, the second point cloud with a second template point cloud, to obtain a pose of the second stacking object.

Step 307: Determining, by the controller, a difference between the pose of the first stacking object and the pose of the second stacking object, and comparing, by the controller, the difference with a threshold, to determine an alignment state between the first stacking object and the second stacking object.

It may be learned from the foregoing procedure that, in the foregoing manner, the controller in the present disclosure can determine, in a stacking process, the difference between the pose of the first stacking object and the pose of the second stacking object, and determine the alignment state between the first stacking object and the second stacking object based on the difference and the threshold. By using this solution, impacts of an external environment (for example, uneven ground) and an error of material handling equipment may be prevented, and pose data of a first stacking object and a second stacking object may be accurately calculated, thereby determining an alignment state between the first stacking object and the second stacking object.

With reference to the embodiments, the following describes in detail steps in the foregoing procedure and effects that can be further generated. It should be noted that terms such as "first" and "second" in the present disclosure do not have limitations on a size, a sequence, a quantity, or the like, but are merely used to distinguish between names. For example, "first stacking object" and "second stacking object" are used to distinguish between two objects. For another example, "first point cloud" and "second point cloud" are used to distinguish between two types of point clouds.

First, with reference to an embodiment, the following describes in detail Step 301, that is, "acquiring, by the controller by using the sensor, the target point cloud of the first stacking object and the target point cloud of the second stacking object".

First, a stacking scenario involved in this embodiment of the present disclosure is briefly described. As shown in FIG. 2, after the material handling equipment receives a handling task of stacking the first stacking object A' onto the second stacking object B', the controller (for example, the controller 104 shown in FIG. 1) controls the fork of the material handling equipment to pick up the first stacking object A', controls the material handling equipment to move near the second stacking object B', aligns the first target region A1 of the first stacking object A' with the second target region B1 of the second stacking object B' by controlling a pose of the material handling equipment, and stacks the first stacking object A' onto the second stacking object B'. When the controller controls the material handling equipment to stack the first stacking object A' onto the second stacking object B', the first stacking object A' and the second stacking object B' are not aligned due to an external environment (for example, uneven ground) and an error of material handling equipment. This embodiment of the present disclosure is a solution proposed to resolve this problem.

In this embodiment of the present disclosure, a plurality of sensors may be selected and installed according to different models of sensors, so that both a first stacking object and a second stacking object are identified through scanning.

An odometer estimates a moving distance of the material handling equipment by measuring motion of the material handling equipment. Generally, a physical quantity such as a position, a speed, or a pose of the material handling equipment is calculated with reference to data collected by the sensor.

The sensor may be disposed at a preset distance (for example, on a truck body or a fork arm structure) below a midpoint between base ends of fork arms of the material handling equipment, or may be disposed in another position according to an actual condition. The odometer may be disposed near a wheel of the material handling equipment, and is configured to record a quantity of circles of rotation of the wheel, to estimate the moving distance. Alternatively, the odometer may be disposed in a center of a chassis of the material handling equipment.

For example, the sensor and the odometer may be controlled by a controller (for example, the controller 104 in FIG. 1) built in the material handling equipment, for example, may be controlled based on a SoC (System-on-a-Chip). This is not specifically limited in embodiments of the present disclosure.

In this embodiment of the present disclosure, when the material handling equipment lifts the first stacking object, and the sensor identifies both the first stacking object and the second stacking object through scanning, the controller acquires the target point cloud of the first stacking object and the target point cloud of the second stacking object by using the sensor. Specifically: the material handling equipment moves the first stacking object to a stacking operation position, the material handling equipment lifts the first stacking object, and when the sensor identifies the first stacking object and the second stacking object through scanning, the sensor acquires the target point cloud of the first stacking object and the target point cloud of the second stacking object.

Herein, the stacking operation position may be a region in which the first stacking object and the second stacking object are to be stacked. In this region, the fork of the material handling equipment can stack the first stacking object and the second stacking object within a variable pose range of the fork. For example, a position within a preset distance range in front of the second stacking object is used as the stacking operation position according to a position of the second stacking object.

The sensor in this embodiment of the present disclosure may include a radar module, and the radar module may include at least one radar. A field of view of the radar can cover a target region of the first stacking object and a target region of the second stacking object. Therefore, the radar may acquire the target point clouds that cover both the first stacking object and the second stacking object. Optionally, the radar is a Lidar. The Lidar may be a three-dimensional Lidar or the like.

It should be noted that this embodiment of the present disclosure may be applied to a scenario with a plurality of stacking objects.

With reference to an embodiment, the following describes in detail Step 303, that is, "extracting, by the controller from the target point clouds, the first point cloud of the first target region of the first stacking object and the second point cloud of the second target region of the second stacking object".

In this embodiment of the present disclosure, after acquiring the target point cloud of the first stacking object and the target point cloud of the second stacking object, the controller is required to extract the first point cloud of the first stacking object from the target point cloud of the first stacking object and extract the second point cloud of the second stacking object from the target point cloud of the second stacking object.

Optionally, the first point cloud may be a point cloud in the first target region of the first stacking object, and the second point cloud may be a point cloud in the second target region of the second stacking object. When the alignment state between the first stacking object and the second stacking object is aligned, the first target region and the second target region are arranged in a vertical direction (for example, the Z-axis direction shown in FIG. 2). When the alignment state between the first stacking object and the second stacking object is aligned, the controller controls the material handling equipment to place the first stacking object onto the second stacking object, to complete stacking.

Specifically, the controller may acquire pre-stored specifications (for example, information such as a size or a shape) of the first stacking object and the second stacking object from the memory, and determine, based on the specifications, the first point cloud of the first target region and the second point cloud of the second target region from the point clouds.

In an example, the first target region includes at least one corner structure region of the first stacking object or a partial region of at least one foot cup of the first stacking object, and the second target region includes at least one corner structure region of the second stacking object or a partial region of at least one upright of the second stacking object. The following provides descriptions with reference to FIG. 4, FIG. 5, and FIG. 6.

Figure 4:
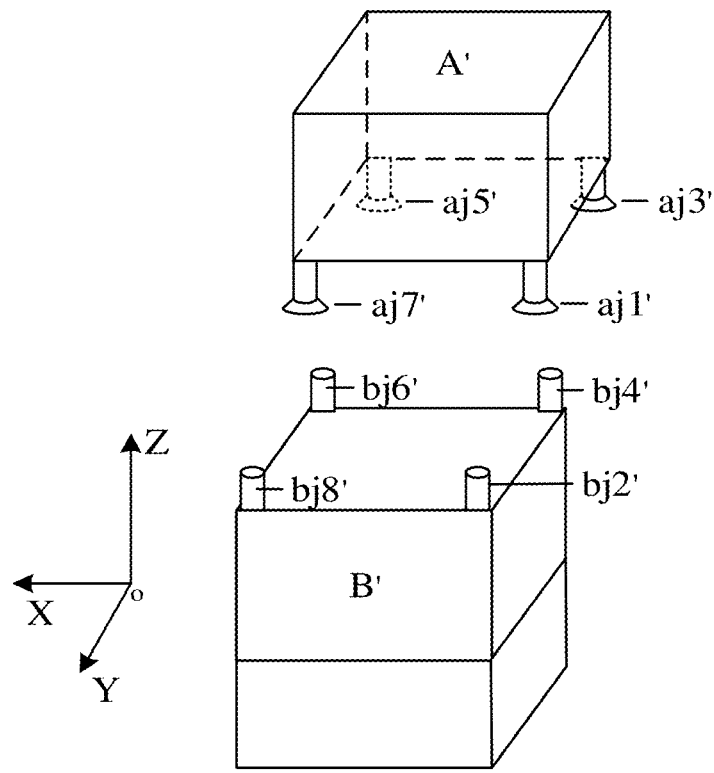
FIG. 4 is a schematic diagram of foot cups and uprights of a first stacking object and a second stacking object according to an embodiment of the present disclosure.

In FIG. 4, a first target region includes a first foot cup aj1' of a first stacking object A', a third foot cup aj3' of the first stacking object A', a fifth foot cup aj5' of the first stacking object A', and a seventh foot cup aj7' of the first stacking object A'. A second target region includes a second upright bj2' of a second stacking object B', a fourth upright bj4' of the second stacking object B', a sixth upright bj6' of the second stacking object B', and an eighth upright bj8' of the second stacking object B'.

Figure 5:
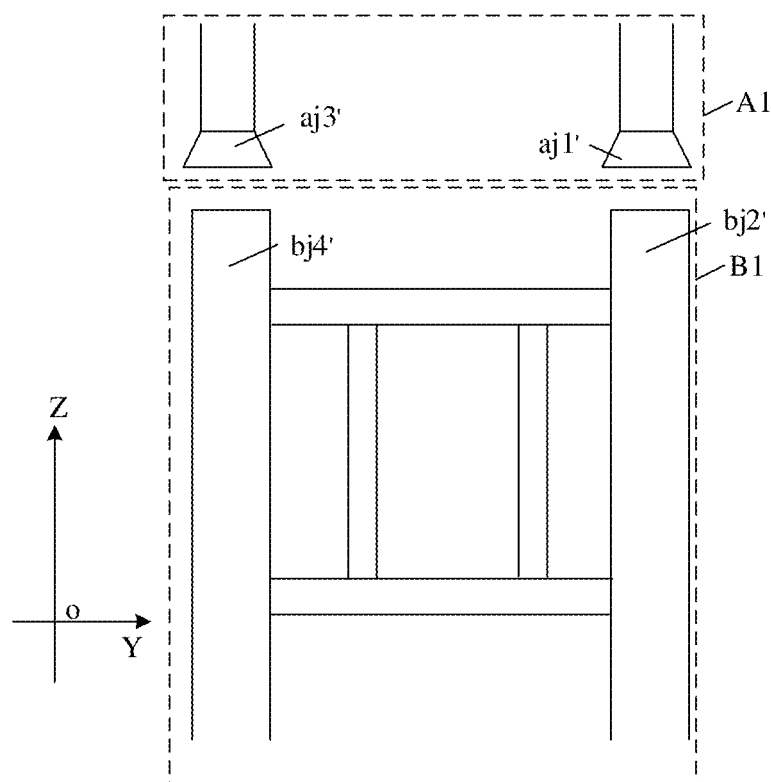
FIG. 5 is a schematic plane diagram of foot cups and uprights of a first stacking object and a second stacking object according to an embodiment of the present disclosure.

In FIG. 5, a first target region A1 includes a first foot cup aj1' of a first stacking object A' and a third foot cup aj3' of the first stacking object A'. A second target region B1 includes a second upright bj2' of a second stacking object B' and a fourth upright bj4' of the second stacking object B'.

Figure 6:
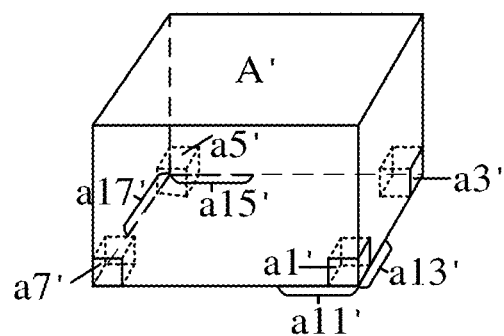
FIG. 6 is a schematic diagram of corner structure regions and edge lines of a first stacking object and a second stacking object according to an embodiment of the present disclosure.
Figure 6:
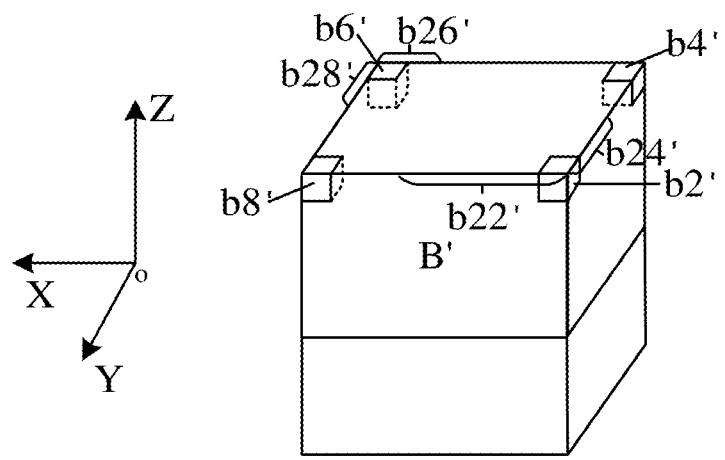

In FIG. 6, a first corner structure region a1' of a first stacking object A', a third corner structure region a3' of the first stacking object A', a fifth corner structure region a5' of the first stacking object A', and a seventh corner structure region a7' of the first stacking object A' are separately marked by using a rectangular cuboid. A second corner structure region b2' of a second stacking object B', a fourth corner structure region b4' of the second stacking object B', a sixth corner structure region b6' of the second stacking object B', and an eighth corner structure region b8' of the second stacking object B' are separately marked by using a rectangular cuboid.

The first target region includes the first corner structure region a1' of the first stacking object A', the third corner structure region a3' of the first stacking object A', the fifth corner structure region a5' of the first stacking object A', and the seventh corner structure region a7' of the first stacking object A'. The second target region includes the second corner structure region b2' of the second stacking object B', the fourth corner structure region b4' of the second stacking object B', the sixth corner structure region b6' of the second stacking object B', and the eighth corner structure region b8' of the second stacking object B'.

The first corner structure region a1' of the first stacking object A' has a first edge line a11' and a third edge line a13' of the first stacking object A', and the first edge line a11' of the first stacking object A' intersects the third edge line a13' of the first stacking object A'. The third corner structure region a3' of the first stacking object A' has the third edge line a13' and a fifth edge line a15' of the first stacking object A', and the third edge line a13' of the first stacking object A' intersects the fifth edge line a15' of the first stacking object A'. The fifth corner structure region a5' of the first stacking object A' has the fifth edge line a15' and a seventh edge line a17' of the first stacking object A', and the fifth edge line a15' of the first stacking object A' intersects the seventh edge line a17' of the first stacking object A'. The seventh corner structure region a7' of the first stacking object A' has the seventh edge line a17' and the first edge line a11' of the first stacking object A', and the seventh edge line a17' of the first stacking object A' intersects the first edge line a11' of the first stacking object A'.

The second corner structure region b2' of the second stacking object B' has a second edge line b22' and a fourth edge line b24' of the second stacking object B', and the second edge line b22' of the second stacking object B' intersects the fourth edge line b24' of the second stacking object B'. The fourth corner structure region b4' of the second stacking object B' has the fourth edge line b24' and a sixth edge line b26' of the second stacking object B', and the fourth edge line b24' of the second stacking object B' intersects the sixth edge line b26' of the second stacking object B'. The sixth corner structure region b6' of the second stacking object B' has the sixth edge line b26' and an eighth edge line b28' of the second stacking object B', and the sixth edge line b26' of the second stacking object B' intersects the eighth edge line b28' of the second stacking object B'. The eighth corner structure region b8' of the second stacking object B' has the eighth edge line b28' and the second edge line b22' of the second stacking object B', and the eighth edge line b28' of the second stacking object B' intersects the second edge line b22' of the second stacking object B'.

For example, the first stacking object is a first material cage, the first target region is located at a bottom of the first material cage, and the first target region includes at least one corner structure region or a partial region of at least one foot cup. For example, the first target region includes at least one of a first corner structure region of the first material cage, a third corner structure region of the first material cage, a fifth corner structure region of the first material cage, or a seventh corner structure region of the first material cage. Alternatively, the first target region includes at least one of a partial region of a first foot cup of the first material cage, a partial region of a third foot cup of the first material cage, a partial region of a fifth foot cup of the first material cage, or a partial region of a seventh foot cup of the first material cage.

For example, the second stacking object is a second material cage, the second target region is located at a top of the second material cage, and the second target region includes at least one corner structure region of the second material cage or a partial region of at least one upright of the second material cage. For example, the second target region includes at least one of a second corner structure region of the second material cage, a fourth corner structure region of the second material cage, a sixth corner structure region of the second material cage, or an eighth corner structure region of the second material cage. Alternatively, the second target region includes at least one of a partial region of a second upright of the second material cage, a partial region of a fourth upright of the second material cage, a partial region of a sixth upright of the second material cage, or a partial region of an eighth upright of the second material cage.

It should be noted that a partial region of a foot cup may refer to that the region at least includes a part or all of the foot cup, and a partial region of an upright may refer to that the region at least includes a part or all of the upright. A foot cup refers to a support component installed at a bottom of a material cage, and is generally used to stabilize the material cage, bear a weight, and protect the material cage against direct contact with the ground. In industrial, warehousing, and logistics scenarios, a material cage (also referred to as a returnable cage or warehouse cage) is often equipped with foot cups, to implement better mobility, stacking, and durability. Uprights refer to vertical support structures around a material cage, and are generally used to bear a weight of the material cage, fix a frame structure of a cage body, and provide a stacking function. An upright is one of core components of the material cage, and design of the upright directly affects strength, stability, and use functions of the material cage.

According to the foregoing descriptions, in a process of determining the first point cloud based on the target point cloud of the first stacking object, pre-processing such as filtering, outlier removal, data cleansing, and data transformation may be further performed on the target point cloud of the first stacking object, and a point cloud of the first target region is extracted from the pre-processed point cloud and used as the first point cloud.

In the present disclosure, pre-processing such as filtering, outlier removal, data cleansing, and data transformation is performed on a point cloud. The pre-processing operation may remove a noise point from the point cloud, and reserve valid data in the point cloud for subsequent use. In this way, accuracy and reliability of a point cloud may be further improved.

With reference to an embodiment, the following describes in detail Step 305, that is, "matching, by the controller, the first point cloud with the first template point cloud, to obtain the pose of the first stacking object, and matching, by the controller, the second point cloud with the second template point cloud, to obtain the pose of the second stacking object".

In this embodiment of the present disclosure, the first point cloud and the first template point cloud are converted into a same coordinate system (for example, the coordinate system in which the material handling equipment is located, as shown in FIG. 2), and the first point cloud and the first template point cloud that are converted into the coordinate system are matched, to obtain the pose of the first stacking object. In addition, the second point cloud and the second template point cloud are converted into a same coordinate system, and the second point cloud and the second template point cloud that are converted into the coordinate system are matched, to obtain the pose of the second stacking object.

In an example, point cloud matching may be performed by using, for example, nearest neighbor search, an ICP (Iterative Closest Point), or the like.

In this embodiment of the present disclosure, the first template point cloud and the second template point cloud may be obtained in advance based on the following steps: performing point cloud collection on a third stacking object and a fourth stacking object that meet an alignment pose standard, to obtain a standard point cloud of the third stacking object and a standard point cloud of the fourth stacking object; and respectively extracting point clouds from the standard point cloud of the third stacking object and the standard point cloud of the fourth stacking object, to obtain the first template point cloud and the second template point cloud in advance.

Herein, the alignment pose standard is a standard used to measure whether the third stacking object and the fourth stacking object are aligned based on a pose of the third stacking object and a pose of the fourth stacking object during stacking. The standard point cloud of the third stacking object and the standard point cloud of the fourth stacking object are respectively point clouds collected by the sensor mounted on the material handling equipment when the pose of the third stacking object and the pose of the fourth stacking object meet the alignment pose standard during stacking.

For example, the third stacking object and the fourth stacking object may be stacked and aligned in advance. Then, point cloud collection is performed on the third stacking object and the fourth stacking object that are in a stacked and aligned state, and the template point cloud (including the corresponding pose) of the third stacking object and the template point cloud (including the corresponding pose) of the fourth stacking object are respectively extracted from collected point clouds. Subsequently, when stacking detection is performed on the first stacking object and the second stacking object with a same structure and a same size, the template point cloud of the third stacking object and the template point cloud of the fourth stacking object that are pre-extracted may be used to respectively determine the pose of the first stacking object and the pose of the second stacking object.

In this embodiment of the present disclosure, point cloud collection is performed on the third stacking object and the fourth stacking object that meet the alignment pose standard. Then, the first template point cloud and the second template point cloud may be respectively extracted from the standard point cloud of the third stacking object and the standard point cloud of the fourth stacking object. This does not require frequent size measurement and simplifies a data collection procedure.

To improve quality of a point cloud, before the standard point cloud of the third stacking object and the standard point cloud of the fourth stacking object are obtained, pre-processing such as filtering or denoising may be performed on an original point cloud of the third stacking object and an original point cloud of the fourth stacking object that are collected by the sensor, to obtain the standard point cloud of the third stacking object and the standard point cloud of the fourth stacking object. In addition, point clouds are respectively extracted from the standard point cloud of the third stacking object and the standard point cloud of the fourth stacking object that are obtained after the pre-processing, to obtain the first template point cloud and the second template point cloud in advance.

Figure 7:
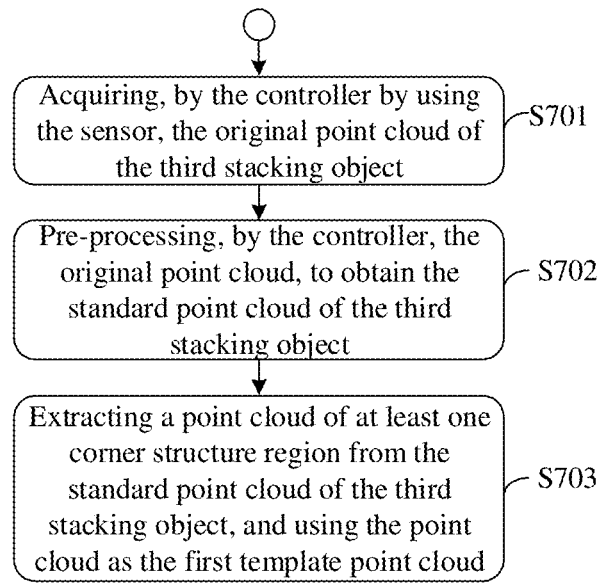
FIG. 7 is a flowchart of generating a first template point cloud.

In FIG. 7, for example, obtaining the first template point cloud specifically includes Step 701 to Step 703.

Step 701: Acquiring, by the controller by using the sensor, the original point cloud of the third stacking object.

Step 702: Pre-processing, by the controller, the original point cloud, to obtain the standard point cloud of the third stacking object.

Step 703: Extracting a point cloud of at least one corner structure region from the standard point cloud of the third stacking object, and using the point cloud as the first template point cloud.

Figure 8:
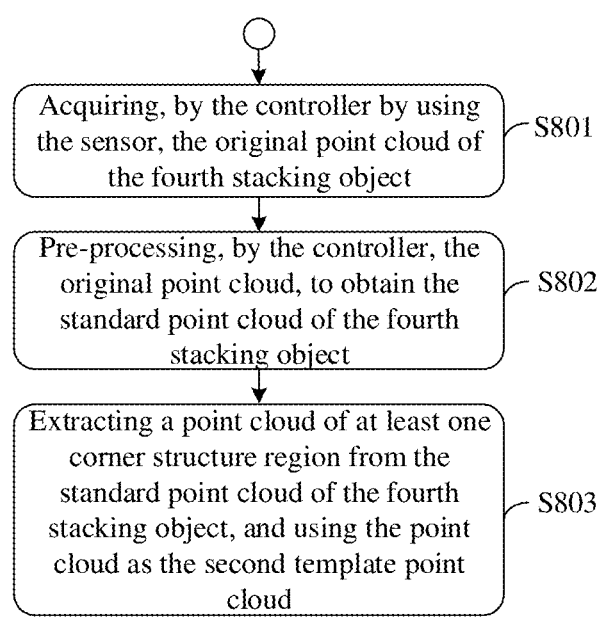
FIG. 8 is a flowchart of generating a second template point cloud.

In FIG. 8, for example, obtaining the second template point cloud specifically includes Step 801 to Step 803.

Step 801: Acquiring, by the controller by using the sensor, the original point cloud of the fourth stacking object.

Step 802: Pre-processing, by the controller, the original point cloud, to obtain the standard point cloud of the fourth stacking object.

Step 803: Extracting a point cloud of at least one corner structure region from the standard point cloud of the fourth stacking object, and using the point cloud as the second template point cloud.

In this embodiment of the present disclosure, when point cloud matching is performed on the first point cloud and the first template point cloud, all or some of the standard point cloud of the third stacking object (for example, a border point cloud with a significant meaning, a point cloud of at least one corner structure region, or a point cloud corresponding to a partial region of a foot cup (or an upright)) may be used as the first template point cloud.

In this embodiment of the present disclosure, a point cloud of at least one corner structure region of the third stacking object is extracted from the standard point cloud of the third stacking object and used as the first template point cloud; and/or, a point cloud of at least one corner structure region of the fourth stacking object is extracted from the standard point cloud of the fourth stacking object and used as the second template point cloud.

The at least one corner structure region of the third stacking object includes at least one of a first corner structure region of the third stacking object, a third corner structure region of the third stacking object, a fifth corner structure region of the third stacking object, or a seventh corner structure region of the third stacking object.

The at least one corner structure region of the fourth stacking object includes at least one of a second corner structure region of the fourth stacking object, a fourth corner structure region of the fourth stacking object, a sixth corner structure region of the fourth stacking object, or an eighth corner structure region of the fourth stacking object.

In an example, the first template point cloud includes a point cloud of the first corner structure region of the third stacking object that is extracted from the standard point cloud of the third stacking object.

The second template point cloud includes a point cloud of the second corner structure region of the fourth stacking object that is extracted from the standard point cloud of the fourth stacking object.

In another example, the first template point cloud includes point clouds of the first corner structure region and the third corner structure region of the third stacking object that are extracted from the standard point cloud of the third stacking object.

The second template point cloud includes point clouds of the second corner structure region and the fourth corner structure region of the fourth stacking object that are extracted from the standard point cloud of the fourth stacking object.

In another example, the first template point cloud includes a point cloud of the first corner structure region of the third stacking object, a point cloud of the third corner structure region of the third stacking object, a point cloud of the fifth corner structure region of the third stacking object, and a point cloud of the seventh corner structure region of the third stacking object that are extracted from the standard point cloud of the third stacking object. The second template point cloud includes a point cloud of the second corner structure region of the fourth stacking object, a point cloud of the fourth corner structure region of the fourth stacking object, a point cloud of the sixth corner structure region of the fourth stacking object, and a point cloud of the eighth corner structure region of the fourth stacking object that are extracted from the standard point cloud of the fourth stacking object. The following provides descriptions with reference to FIG. 9.

Figure 9:
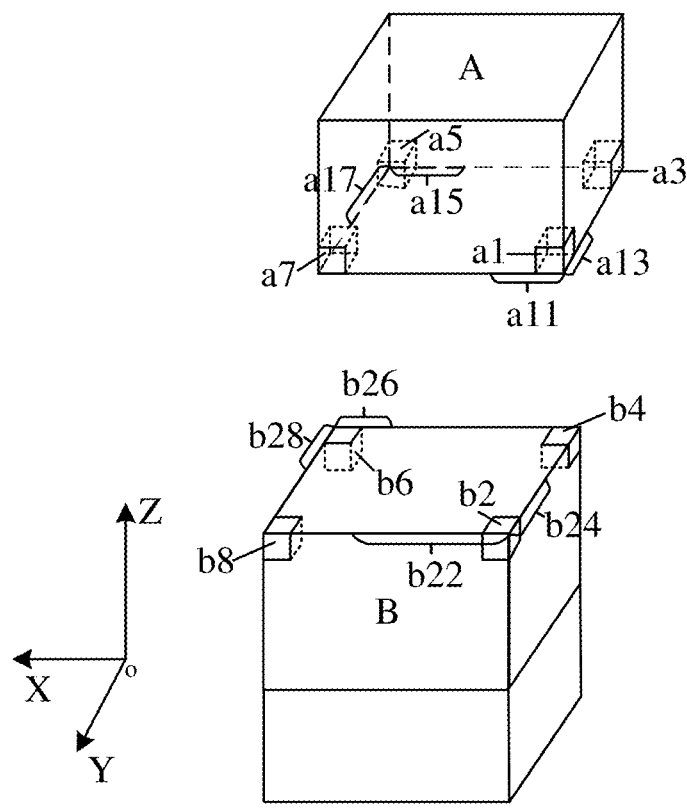
FIG. 9 is a schematic diagram of corner structure regions and edge lines of a third stacking object and a fourth stacking object according to an embodiment of the present disclosure.

In FIG. 9, a first corner structure region a1 of a third stacking object A, a third corner structure region a3 of the third stacking object A, a fifth corner structure region a5 of the third stacking object A, and a seventh corner structure region a7 of the third stacking object A are separately marked by using a rectangular cuboid. A second corner structure region b2 of a fourth stacking object B, a fourth corner structure region b4 of the fourth stacking object B, a sixth corner structure region b6 of the fourth stacking object B, and an eighth corner structure region b8 of the fourth stacking object B are separately marked by using a rectangular cuboid.

The first corner structure region a1 of the third stacking object A has a first edge line a11 and a third edge line a13 of the third stacking object A, and the first edge line a11 of the third stacking object A intersects the third edge line a13 of the third stacking object A. The third corner structure region a3 of the third stacking object A has the third edge line a13 and a fifth edge line a15 of the third stacking object A, and the third edge line a13 of the third stacking object A intersects the fifth edge line a15 of the third stacking object A. The fifth corner structure region a5 of the third stacking object A has the fifth edge line a15 and a seventh edge line a17 of the third stacking object A, and the fifth edge line a15 of the third stacking object A intersects the seventh edge line a17 of the third stacking object A. The seventh corner structure region a7 of the third stacking object A has the seventh edge line a17 and the first edge line a11 of the third stacking object A, and the seventh edge line a17 of the third stacking object A intersects the first edge line a11 of the third stacking object A.

The second corner structure region b2 of the fourth stacking object B has a second edge line b22 and a fourth edge line b24 of the fourth stacking object B, and the second edge line b22 of the fourth stacking object B intersects the fourth edge line b24 of the fourth stacking object B. The fourth corner structure region b4 of the fourth stacking object B has the fourth edge line b24 and a sixth edge line b26 of the fourth stacking object B, and the fourth edge line b24 of the fourth stacking object B intersects the sixth edge line b26 of the fourth stacking object B. The sixth corner structure region b6 of the fourth stacking object B has the sixth edge line b26 and an eighth edge line b28 of the fourth stacking object B, and the sixth edge line b26 of the fourth stacking object B intersects the eighth edge line b28 of the fourth stacking object B. The eighth corner structure region b8 of the fourth stacking object B has the eighth edge line b28 and the second edge line b22 of the fourth stacking object B, and the eighth edge line b28 of the fourth stacking object B intersects the second edge line b22 of the fourth stacking object B.

In this embodiment of the present disclosure, a point cloud of a partial region of at least one foot cup of the third stacking object is extracted from the standard point cloud of the third stacking object and used as the first template point cloud; and/or, a point cloud of a partial region of at least one upright of the fourth stacking object is extracted from the standard point cloud of the fourth stacking object and used as the second template point cloud.

The partial region of the at least one foot cup of the third stacking object includes at least one of a partial region of a first foot cup of the third stacking object, a partial region of a third foot cup of the third stacking object, a partial region of a fifth foot cup of the third stacking object, or a partial region of a seventh foot cup of the third stacking object.

The partial region of the at least one upright of the fourth stacking object includes at least one of a partial region of a second upright of the fourth stacking object, a partial region of a fourth upright of the fourth stacking object, a partial region of a sixth upright of the fourth stacking object, or a partial region of an eighth upright of the fourth stacking object.

In an example, the first template point cloud includes a point cloud of the partial region of the first foot cup of the third stacking object that is extracted from the standard point cloud of the third stacking object.

The second template point cloud includes a point cloud of the partial region of the second upright of the fourth stacking object that is extracted from the standard point cloud of the fourth stacking object.

In another example, the first template point cloud includes a point cloud of the partial region of the first foot cup of the third stacking object and a point cloud of the partial region of the third foot cup of the third stacking object that are extracted from the standard point cloud of the third stacking object.

The second template point cloud includes a point cloud of the partial region of the second upright of the fourth stacking object and a point cloud of the partial region of the fourth upright of the fourth stacking object that are extracted from the standard point cloud of the fourth stacking object.

In another example, the first template point cloud includes a point cloud of the partial region of the first foot cup of the third stacking object, a point cloud of the partial region of the third foot cup of the third stacking object, a point cloud of the partial region of the fifth foot cup of the third stacking object, and a point cloud of the partial region of the seventh foot cup of the third stacking object that are extracted from the standard point cloud of the third stacking object. The second template point cloud includes a point cloud of the partial region of the second upright of the fourth stacking object, a point cloud of the partial region of the fourth upright of the fourth stacking object, a point cloud of the partial region of the sixth upright of the fourth stacking object, and a point cloud of the partial region of the eighth upright of the fourth stacking object that are extracted from the standard point cloud of the fourth stacking object. The following provides descriptions with reference to FIG. 10.

Figure 10:
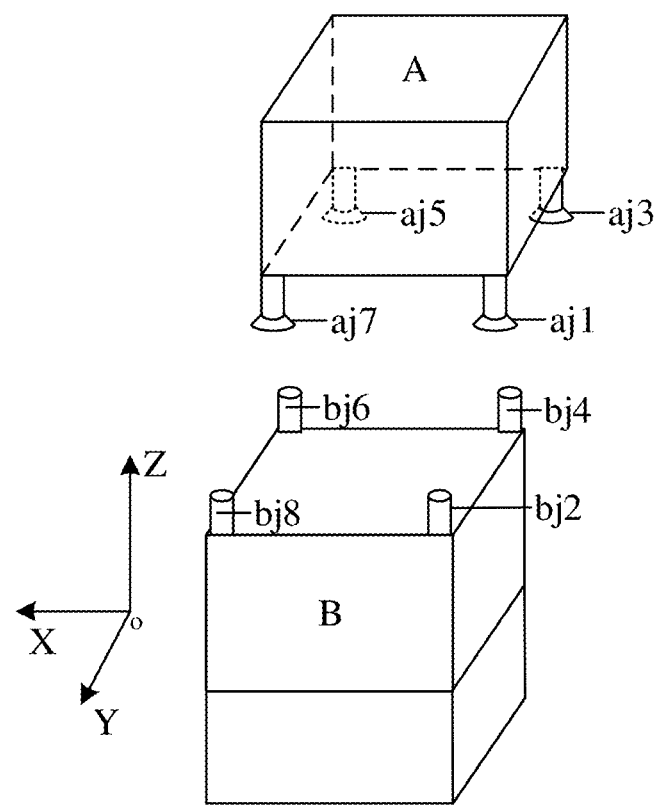
FIG. 10 is a schematic diagram of foot cups and uprights of a third stacking object and a fourth stacking object according to an embodiment of the present disclosure.

In FIG. 10, at least one foot cup of a third stacking object A includes a first foot cup aj1 of the third stacking object A, a third foot cup aj3 of the third stacking object A, a fifth foot cup aj5 of the third stacking object A, and a seventh foot cup aj7 of the third stacking object A.

In FIG. 10, at least one upright of a fourth stacking object B includes a second upright bj2 of the fourth stacking object B, a fourth upright bj4 of the fourth stacking object B, a sixth upright bj6 of the fourth stacking object B, and an eighth upright bj8 of the fourth stacking object B.

The following describes in detail a process of matching the first point cloud with the first template point cloud.

In this embodiment of the present disclosure, point cloud matching may be performed on the first point cloud and the first template point cloud in the following several manners: matching a first point cloud of at least one corner structure region of the first stacking object with a first template point cloud; or, matching a first point cloud of a partial region of at least one foot cup of the first stacking object with a first template point cloud; or, matching a first point cloud with a first template point cloud of at least one corner structure region of the third stacking object (that is, a point cloud of at least one corner structure region of the third stacking object that is extracted from the standard point cloud of the third stacking object); or, matching a first point cloud with a first template point cloud of a partial region of at least one foot cup of the third stacking object; or, matching a first point cloud of at least one corner structure region of the first stacking object with a first template point cloud of at least one corner structure region of the third stacking object; or, matching a first point cloud of a partial region of at least one foot cup of the first stacking object with a first template point cloud of a partial region of at least one foot cup of the third stacking object. In these several matching manners, a processing volume during matching between the first point cloud and the first template point cloud may also be reduced.

Matching the first point cloud of the at least one corner structure region of the first stacking object with the first template point cloud of the at least one corner structure region of the third stacking object includes at least one of the following: matching a first point cloud of a first corner structure region of the first stacking object with a first template point cloud of a first corner structure region of the third stacking object; matching a first point cloud of a third corner structure region of the first stacking object with a first template point cloud of a third corner structure region of the third stacking object; matching a first point cloud of a fifth corner structure region of the first stacking object with a first template point cloud of a fifth corner structure region of the third stacking object; or matching a first point cloud of a seventh corner structure region of the first stacking object with a first template point cloud of a seventh corner structure region of the third stacking object.

In this embodiment of the present disclosure, the first point cloud of the at least one corner structure region of the first stacking object is matched with the first template point cloud of the at least one corner structure region of the third stacking object. In addition to ensuring matching accuracy, a processing volume during matching can be further reduced, thereby improving a matching speed, thus accelerating a speed of stacking the first stacking object and the second stacking object.

Matching a first point cloud of a partial region of at least one foot cup of the first stacking object with a first template point cloud of a partial region of at least one foot cup of the third stacking object includes at least one of the following: matching a first point cloud of a partial region of a first foot cup of the first stacking object with a first template point cloud of a partial region of a first foot cup of the third stacking object; matching a first point cloud of a partial region of a third foot cup of the first stacking object with a first template point cloud of a partial region of a third foot cup of the third stacking object; matching a first point cloud of a partial region of a fifth foot cup of the first stacking object with a first template point cloud of a partial region of a fifth foot cup of the third stacking object; or matching a first point cloud of a partial region of a seventh foot cup of the first stacking object with a first template point cloud of a partial region of a seventh foot cup of the third stacking object.

In this embodiment of the present disclosure, the first point cloud of the partial region of the at least one foot cup of the first stacking object is matched with the first template point cloud of the partial region of the at least one foot cup of the third stacking object. In addition to ensuring matching accuracy, a processing volume during matching can be further reduced, thereby improving a matching speed, thus accelerating a speed of stacking the first stacking object and the second stacking object.

The following describes in detail a process of matching the second point cloud with the second template point cloud.

In this embodiment of the present disclosure, the second point cloud may be matched with the second template point cloud in the following several manners: matching a second point cloud of at least one corner structure region of the second stacking object with a second template point cloud; matching a second point cloud of a partial region of at least one upright of the second stacking object with a second template point cloud; matching a second point cloud with a second template point cloud of at least one corner structure region of the fourth stacking object; matching a second point cloud with a second template point cloud of a partial region of at least one upright of the fourth stacking object; matching a second point cloud of at least one corner structure region of the second stacking object with a second template point cloud of at least one corner structure region of the fourth stacking object; or matching a second point cloud of a partial region of at least one upright of the second stacking object with a second template point cloud of a partial region of at least one upright of the fourth stacking object. In these several matching manners, a processing volume during matching between the second point cloud and the second template point cloud may also be reduced.

Matching the second point cloud of the at least one corner structure region of the second stacking object with the second template point cloud of the at least one corner structure region of the fourth stacking object includes at least one of the following: matching a second point cloud of a second corner structure region of the second stacking object with a second template point cloud of a second corner structure region of the fourth stacking object; matching a second point cloud of a fourth corner structure region of the second stacking object with a second template point cloud of a fourth corner structure region of the fourth stacking object; matching a second point cloud of a sixth corner structure region of the second stacking object with a second template point cloud of a sixth corner structure region of the fourth stacking object; or matching a second point cloud of an eighth corner structure region of the second stacking object with a second template point cloud of an eighth corner structure region of the fourth stacking object.

In this embodiment of the present disclosure, the second point cloud of the at least one corner structure region of the second stacking object is matched with the second template point cloud of the at least one corner structure region of the fourth stacking object. In addition to ensuring matching accuracy, a processing volume during matching can be further reduced, thereby improving a matching speed, thus accelerating a speed of stacking the first stacking object and the second stacking object.

Matching the second point cloud of the partial region of the at least one upright of the second stacking object with the second template point cloud of the partial region of the at least one upright of the fourth stacking object includes at least one of the following: matching a second point cloud of a partial region of a second upright of the second stacking object with a second template point cloud of a partial region of a second upright of the fourth stacking object; matching a second point cloud of a partial region of a fourth upright of the second stacking object with a second template point cloud of a partial region of a fourth upright of the fourth stacking object; matching a second point cloud of a partial region of a sixth upright of the second stacking object with a second template point cloud of a partial region of a sixth upright of the fourth stacking object; or matching a second point cloud of a partial region of an eighth upright of the second stacking object with a second template point cloud of a partial region of an eighth upright of the fourth stacking object.

In this embodiment of the present disclosure, the second point cloud of the partial region of the at least one upright of the second stacking object is matched with the second template point cloud of the partial region of the at least one upright of the fourth stacking object. In addition to ensuring matching accuracy, a processing volume during matching can be further reduced, thereby improving a matching speed, thus accelerating a speed of stacking the first stacking object and the second stacking object.

Figure 11:
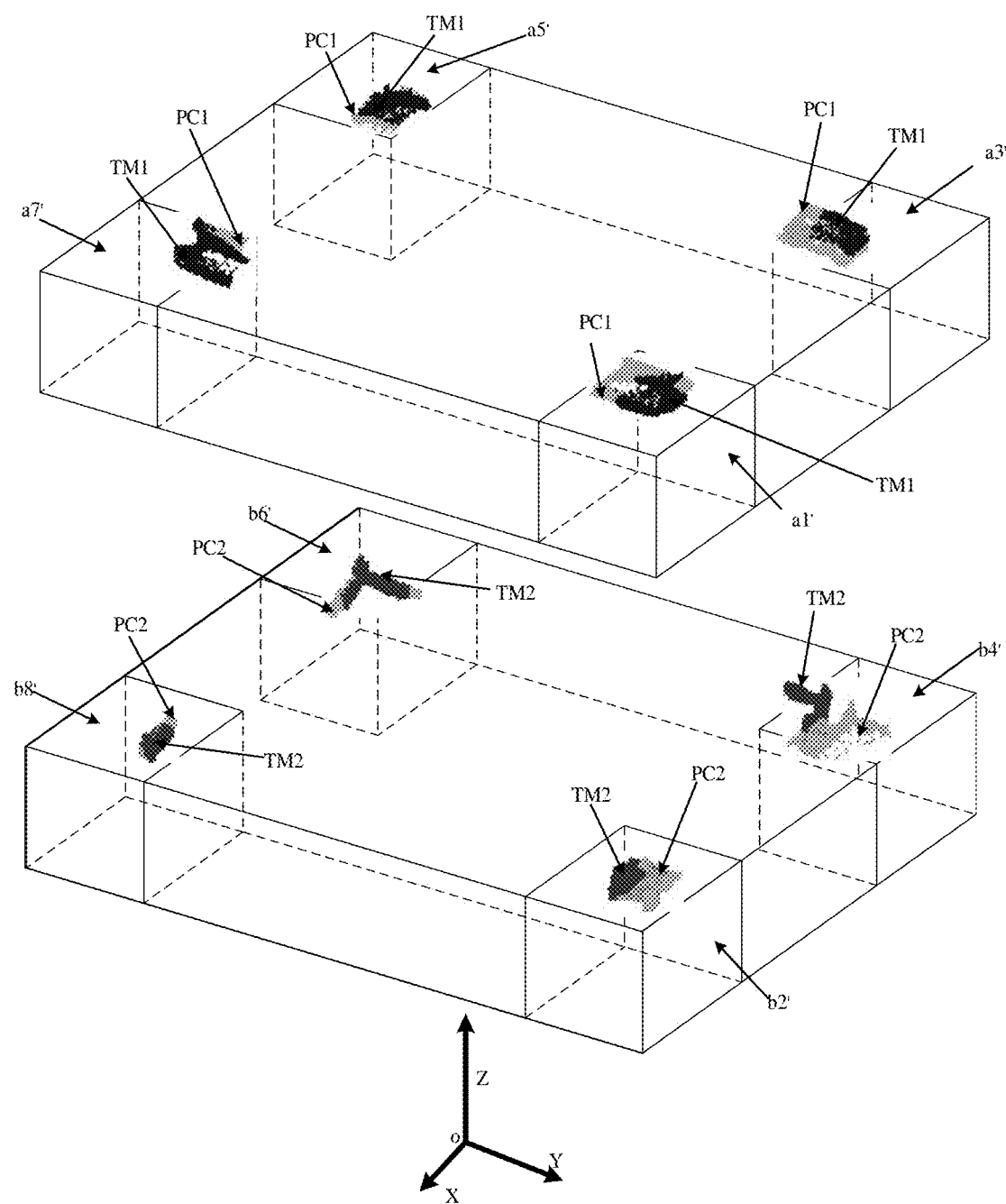
FIG. 11 is a schematic diagram of determining an alignment state according to an embodiment of the present disclosure.
Figure 12:
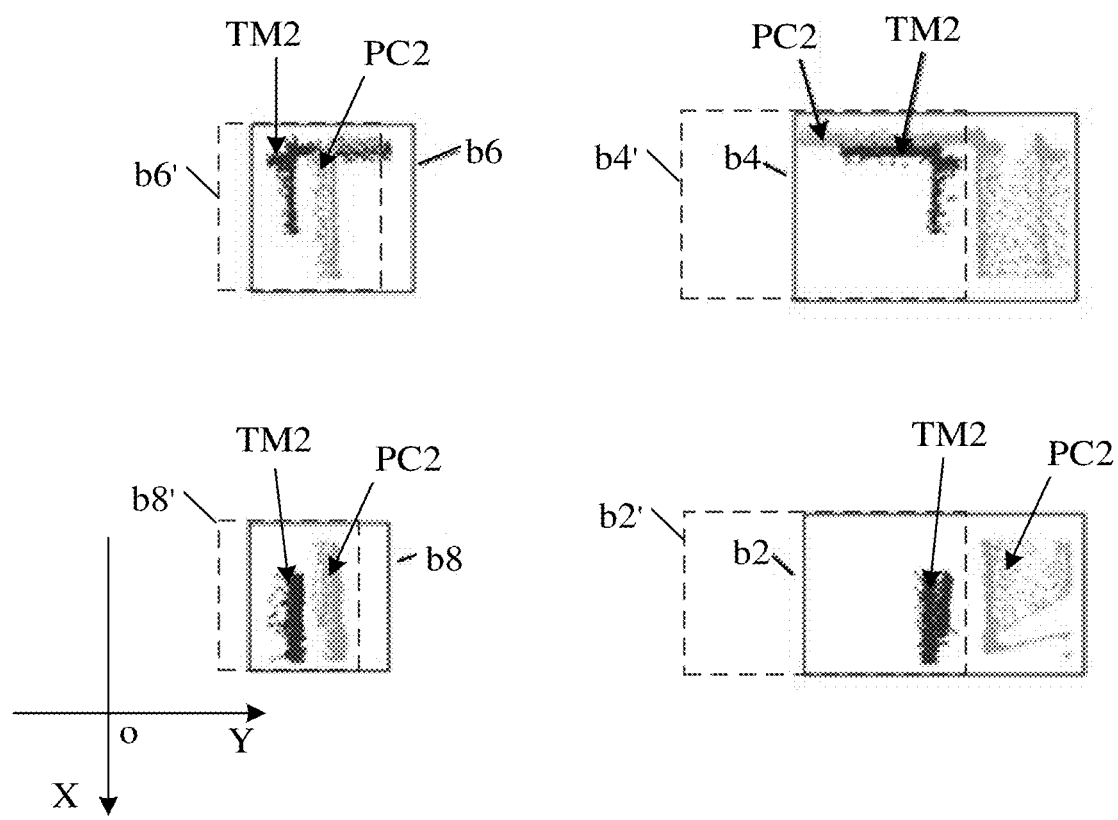
FIG. 12 is a schematic diagram of a second point cloud and a second template point cloud before closed-loop detection according to an embodiment of the present disclosure.

With reference to FIG. 11 and FIG. 12, the following describes a process of obtaining the pose of the first stacking object and the pose of the second stacking object in an embodiment.

In FIG. 11, a first corner structure region a1' of a first stacking object A', a third corner structure region a3' of the first stacking object A', a fifth corner structure region a5' of the first stacking object A', and a seventh corner structure region a7' of the first stacking object A' are separately marked by using a rectangular cuboid. A second corner structure region b2' of a second stacking object B', a fourth corner structure region b4' of the second stacking object B', a sixth corner structure region b6' of the second stacking object B', and an eighth corner structure region b8' of the second stacking object B' are separately marked by using a rectangular cuboid.

In FIG. 11, a light gray part in the first stacking object A' represents a first point cloud PC1, and a black part represents a first template point cloud TM1; a light gray part in the second stacking object B' represents a second point cloud PC2, and a black part represents a second template point cloud TM2.

The first template point cloud TM1 corresponding to a first corner structure region a1 of a third stacking object A is matched with the first point cloud PC1 corresponding to the first corner structure region a1' of the first stacking object A', the first template point cloud TM1 corresponding to a third corner structure region a3 of the third stacking object A is matched with the first point cloud PC1 corresponding to the third corner structure region a3' of the first stacking object A', the first template point cloud TM1 corresponding to a fifth corner structure region a5 of the third stacking object A is matched with the first point cloud PC1 corresponding to the fifth corner structure region a5' of the first stacking object A', and the first template point cloud TM1 corresponding to a seventh corner structure region a7 of the third stacking object A is matched with the first point cloud PC1 corresponding to the seventh corner structure region a7' of the first stacking object A'.

In FIG. 12, matching the second template point cloud TM2 with the second point cloud PC2 refers to: matching the second template point cloud TM2 corresponding to a second corner structure region b2 of a fourth stacking object B with the second point cloud PC2 corresponding to the second corner structure region b2' of the second stacking object B', matching the second template point cloud TM2 corresponding to a fourth corner structure region b4 of the fourth stacking object B with the second point cloud PC2 corresponding to the fourth corner structure region b4' of the second stacking object B', matching the second template point cloud TM2 corresponding to a sixth corner structure region b6 of the fourth stacking object B with the second point cloud PC2 corresponding to the sixth corner structure region b6' of the second stacking object B', and matching the second template point cloud TM2 corresponding to an eighth corner structure region b8 of the fourth stacking object B with the second point cloud PC2 corresponding to the eighth corner structure region b8' of the second stacking object B'.

In this embodiment of the present disclosure, a structure and a size of the third stacking object are the same as those of the first stacking object, and at least one corner structure region of the third stacking object corresponds to a same position as at least one corner structure region of the first stacking object. For example, a position of a first corner structure region on the third stacking object is the same as that of a first corner structure region on the first stacking object, and the first corner structure region of the first stacking object and the first corner structure region of the third stacking object may be marked by using geometrical shapes with a same size.

A structure and a size of the fourth stacking object are the same as those of the second stacking object, and at least one corner structure region of the fourth stacking object corresponds to a same position as at least one corner structure region of the second stacking object. For example, a position of a second corner structure region on the fourth stacking object is the same as that of a second corner structure region on the second stacking object, and the second corner structure region of the second stacking object and the second corner structure region of the fourth stacking object may be marked by using geometrical shapes with a same size. The following provides descriptions with reference to FIG. 12, and FIG. 13.

It should be noted that in FIG. 12, a rectangular cuboid with solid lines represents a corner structure region of a fourth stacking object, and a rectangular cuboid with dashed lines represents a corner structure region of a second stacking object.

FIG. 12 is a schematic diagram of point clouds before matching between a second point cloud and a second template point cloud is completed. In this case, a rectangular cuboid (that is, the rectangular cuboid with dashed lines) that marks a second corner structure region b2' of the second stacking object does not overlap a rectangular cuboid (that is, the rectangular cuboid with solid lines) that marks a second corner structure region b2 of the fourth stacking object. A rectangular cuboid (that is, the rectangular cuboid with dashed lines) that marks a fourth corner structure region b4' of the second stacking object does not overlap a rectangular cuboid (that is, the rectangular cuboid with solid lines) that marks a fourth corner structure region b4 of the fourth stacking object. A rectangular cuboid (that is, the rectangular cuboid with dashed lines) that marks a sixth corner structure region b6' of the second stacking object does not overlap a rectangular cuboid (that is, the rectangular cuboid with solid lines) that marks a sixth corner structure region b6 of the fourth stacking object. A rectangular cuboid (that is, the rectangular cuboid with dashed lines) that marks an eighth corner structure region b8' of the second stacking object does not overlap a rectangular cuboid (that is, the rectangular cuboid with solid lines) that marks an eighth corner structure region b8 of the fourth stacking object. In addition, matching between a second point cloud PC2 in light gray and a second template point cloud TM2 in black is not completed.

Figure 13:
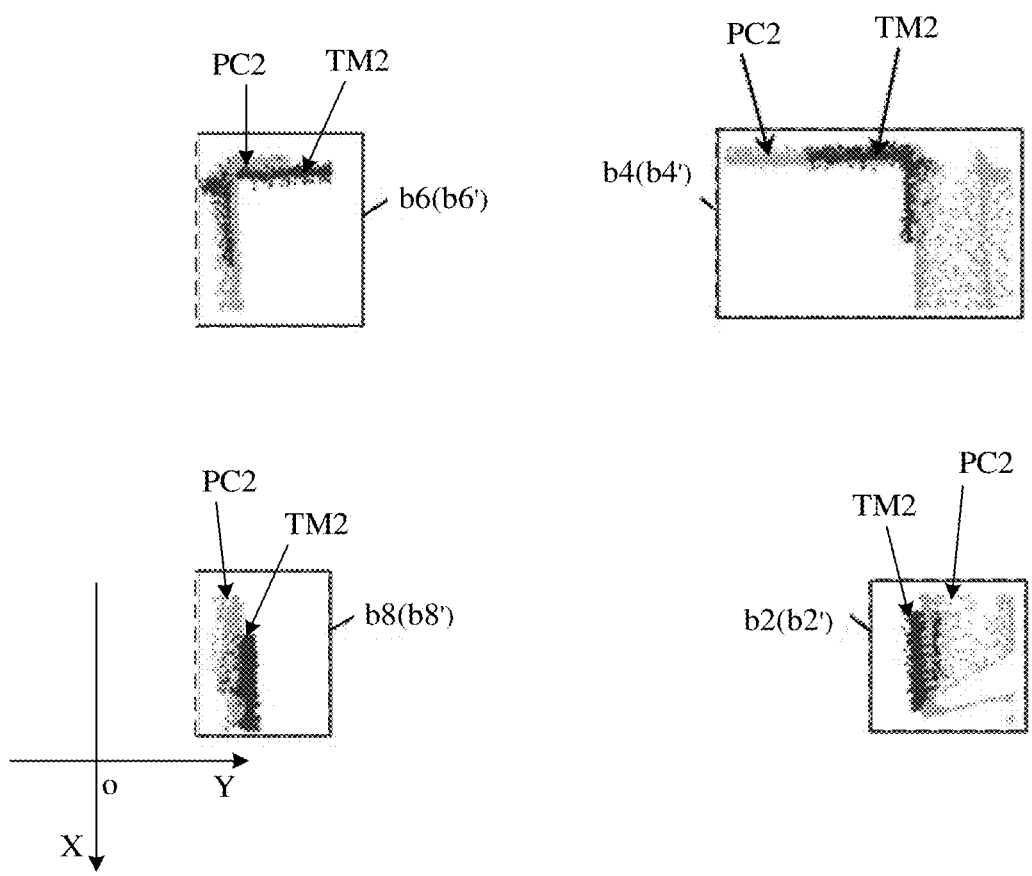
FIG. 13 is a schematic diagram of a second point cloud and a second template point cloud after closed-loop detection according to an embodiment of the present disclosure.

FIG. 13 is a schematic diagram of point clouds after matching between a second point cloud and a second template point cloud is completed. In this case, a rectangular cuboid (that is, the rectangular cuboid with dashed lines) that marks a second corner structure region b2' of a second stacking object overlaps a rectangular cuboid (that is, the rectangular cuboid with solid lines) that marks a second corner structure region b2 of a fourth stacking object. A rectangular cuboid (that is, the rectangular cuboid with dashed lines) that marks a fourth corner structure region b4' of the second stacking object overlaps a rectangular cuboid (that is, the rectangular cuboid with solid lines) that marks a fourth corner structure region b4 of the fourth stacking object. A rectangular cuboid (that is, the rectangular cuboid with dashed lines) that marks a sixth corner structure region b6' of the second stacking object overlaps a rectangular cuboid (that is, the rectangular cuboid with solid lines) that marks a sixth corner structure region b6 of the fourth stacking object. A rectangular cuboid (that is, the rectangular cuboid with dashed lines) that marks an eighth corner structure region b8' of the second stacking object overlaps a rectangular cuboid (that is, the rectangular cuboid with solid lines) that marks an eighth corner structure region b8 of the fourth stacking object. In addition, matching between a second point cloud PC2 in light gray and a second template point cloud TM2 in black is completed.

After matching is completed, the pose of the second stacking object is determined based on a pose relationship before and after matching. The pose of the first stacking object may be determined in the same manner.

With reference to an embodiment, the following describes in detail Step 307, that is, "determining, by the controller, the difference between the pose of the first stacking object and the pose of the second stacking object, and comparing, by the controller, the difference with the threshold, to determine the alignment state between the first stacking object and the second stacking object".

In this embodiment of the present disclosure, the controller may determine the alignment state between the first stacking object and the second stacking object based on the threshold and the difference between the pose of the first stacking object and the pose of the second stacking object. When the difference is greater than or equal to the threshold, it is determined that the alignment state is not aligned; or when the difference is less than the threshold, it is determined that the alignment state is aligned.

In an example, when the difference is greater than or equal to the threshold, the method further includes: controlling, by the controller, material handling equipment to adjust a pose; re-acquiring, by the controller by using the sensor, a target point cloud of the first stacking object and a target point cloud of the second stacking object; re-determining, by the controller, a difference between a pose of the first stacking object and a pose of the second stacking object; and re-determining, by the controller based on the difference, the alignment state until the difference is less than the threshold.

In an example, when the difference is less than the threshold, the method further includes: controlling, by the controller, material handling equipment to place the first stacking object onto the second stacking object, to complete stacking.

Herein, the threshold is used to measure whether the material handling equipment is controlled to execute stacking on the first stacking object and the second stacking object, and the threshold may be set according to alignment precision of the first stacking object and the second stacking object.

With reference to FIG. 4, FIG. 5, and FIG. 6, the following separately describes that the alignment state is aligned.

In FIG. 4, if the difference between the pose of the first stacking object and the pose of the second stacking object is less than the threshold, it is determined that the alignment state is aligned. In this case, a partial region aj1' of the first foot cup of the first stacking object A' is aligned with a partial region bj2' of the second upright of the second stacking object B', a partial region aj3' of the third foot cup of the first stacking object A' is aligned with a partial region bj4' of the fourth upright of the second stacking object B', a partial region aj5' of the fifth foot cup of the first stacking object A' is aligned with a partial region bj6' of the sixth upright of the second stacking object B', and a partial region aj7' of the seventh foot cup of the first stacking object A' is aligned with a partial region bj8' of the eighth upright of the second stacking object B'.

In FIG. 5, if the difference between the pose of the first stacking object and the pose of the second stacking object is less than the threshold, it is determined that the alignment state is aligned. In this case, the first target region A1 and the second target region B1 are arranged in a vertical direction, a partial region aj3' of the third foot cup of the first stacking object is aligned with a partial region bj4' of the fourth upright of the second stacking object, and a partial region aj1' of the first foot cup of the first stacking object is aligned with a partial region bj2' of the second upright of the second stacking object.

In FIG. 6, if the difference between the pose of the first stacking object and the pose of the second stacking object is less than the threshold, it is determined that the alignment state is aligned. In this case, the first target region is located at a bottom of the first stacking object A', the second target region is located at a top of the second stacking object B', and the first target region and the second target region are arranged in a vertical direction. The first corner structure region a1' of the first stacking object A' is aligned with the second corner structure region b2' of the second stacking object B', the third corner structure region a3' of the first stacking object A' is aligned with the fourth corner structure region b4' of the second stacking object B', the fifth corner structure region a5' of the first stacking object A' is aligned with the sixth corner structure region b6' of the second stacking object B', and the seventh corner structure region a7' of the first stacking object A' is aligned with the eighth corner structure region b8' of the second stacking object B'. The first edge line a11' of the first stacking object A' is aligned with the second edge line b22' of the second stacking object B', the third edge line a13' of the first stacking object A' is aligned with the fourth edge line b24' of the second stacking object B', the fifth edge line a15' of the first stacking object A' is aligned with the sixth edge line b26' of the second stacking object B', and the seventh edge line a17' of the first stacking object A' is aligned with the eighth edge line b28' of the second stacking object B'.

In addition, to enhance reliability of an alignment operation and prevent a failure attempt that is endlessly repeated due to an abnormality, an embodiment of the present disclosure further proposes an alarm reporting mechanism. Specifically, the controller counts a quantity of times of misalignment, and outputs an alarm prompt once the quantity of times of misalignment exceeds a preset quantity of times of misalignment or alignment is not completed within a preset time. This mechanism is designed to alert operators to a potential problem of an automatic control system in a timely manner, so that the operators take appropriate intervening measures to ensure continuity and safety of alignment operations.

In this embodiment of the present disclosure, before the alignment state is determined, the method further includes: controlling, by the controller, material handling equipment to move the first stacking object to a stacking preparation position, to complete a pre-alignment action relative to the second stacking object.

The stacking preparation position refers to a position before a stacking operation position is reached, and the pose of the second stacking object can be acquired by the material handling equipment in this position. The stacking operation position is a position in which a sensor on the material handling equipment may acquire both target data (for example, a target image) of the first stacking object and target data of the second stacking object.

Pre-alignment refers to that the first stacking object and the second stacking object are basically aligned in a Y-axis direction by adjusting a pose of the material handling equipment. That is, a difference $\Delta Y$ in Y-axis coordinates between the first stacking object and the second stacking object and a difference $\Delta\Psi$ in rotation angles around a Z-axis between the first stacking object and the second stacking object are within preset thresholds. The thresholds may be flexibly adjusted according to different material handling equipments and different stacking objects, for example, $-5$ cm$<\Delta Y<5$ cm, and $-3°<\Delta\Psi<3°$.

In a pre-alignment phase, the material handling equipment carries the first stacking object to a front of the second stacking object, then the material handling equipment first lifts a fork to an optimal detection height, calculates a pose of an upright by detecting a feature such as an upright of the second stacking object, and adjusts a chassis or the fork, to complete pre-alignment.

Figure 14:
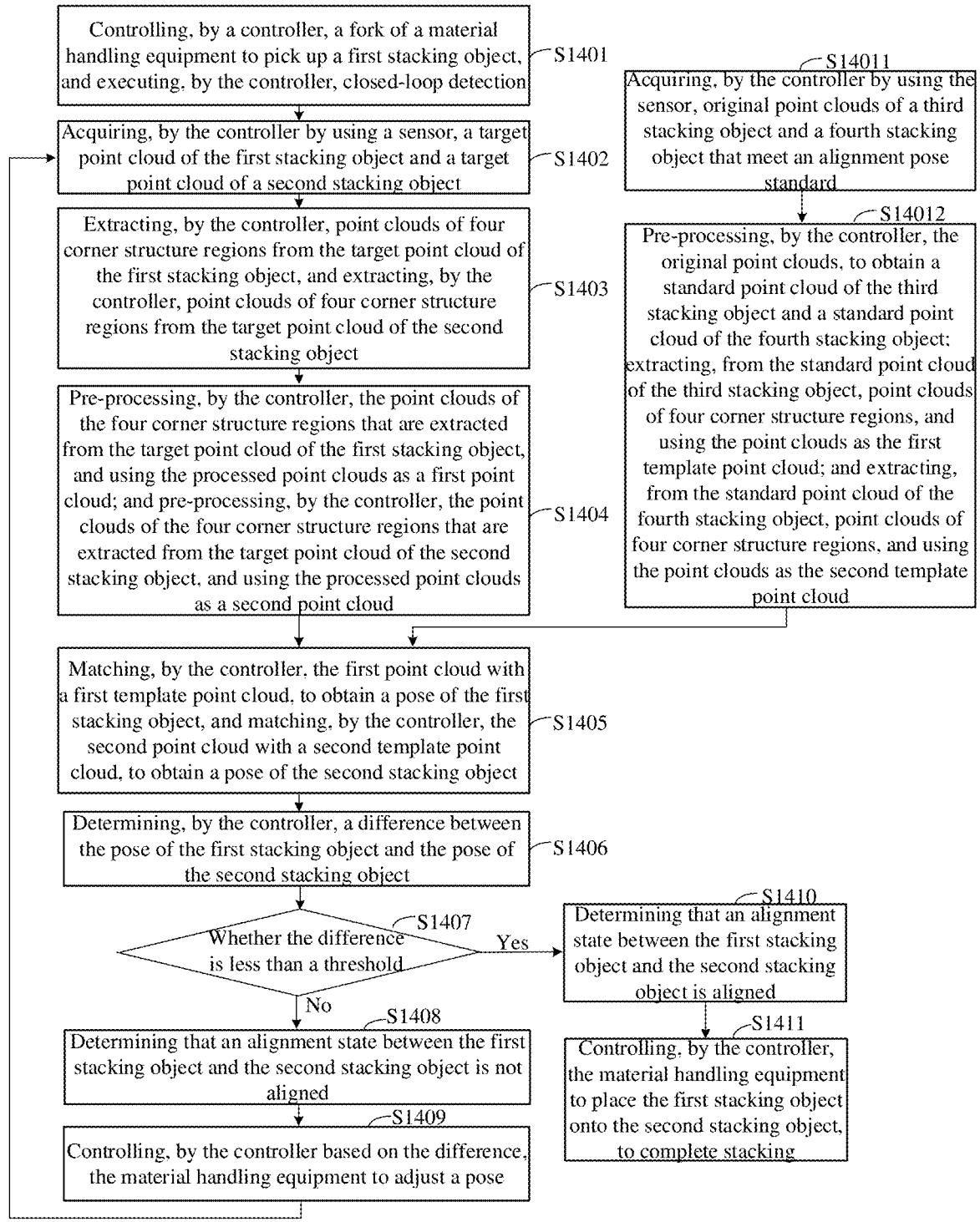
FIG. 14 is a flowchart of a method for determining an alignment state according to an embodiment of the present disclosure.

With reference to an actual application scenario, the following describes an implementation of a method proposed in embodiments of the present disclosure. As shown in FIG. 14, an execution body is material handling equipment, and a process of matching a corner structure region of a first stacking object with a corner structure region of a second stacking object is described as follows. The method may include Step 1401 to Step 1411.

Step 1401: Controlling, by a controller, a fork of the material handling equipment to pick up the first stacking object, and executing, by the controller, closed-loop detection.

Step 1402: Acquiring, by the controller by using a sensor, a target point cloud of the first stacking object and a target point cloud of the second stacking object.

Step 1403: Extracting, by the controller, point clouds of four corner structure regions from the target point cloud of the first stacking object, and extracting, by the controller, point clouds of four corner structure regions from the target point cloud of the second stacking object.

The extracting, by the controller, the point clouds of the four corner structure regions from the target point cloud of the first stacking object includes: extracting, by the controller from the target point cloud of the first stacking object, the point clouds of a first corner structure region, a third corner structure region, a fifth corner structure region, and a seventh corner structure region of the first stacking object.

The extracting, by the controller, the point clouds of the four corner structure regions from the target point cloud of the second stacking object includes: extracting, by the controller from the target point cloud of the second stacking object, the point clouds of a second corner structure region, a fourth corner structure region, a sixth corner structure region, and an eighth corner structure region of the second stacking object.

Step 1404: Pre-processing, by the controller, the point clouds of the four corner structure regions that are extracted from the target point cloud of the first stacking object, and using the processed point clouds as a first point cloud; and pre-processing, by the controller, the point clouds of the four corner structure regions that are extracted from the target point cloud of the second stacking object, and using the processed point clouds as a second point cloud.

Step 1405: Matching, by the controller, the first point cloud with a first template point cloud, to obtain a pose of the first stacking object, and matching, by the controller, the second point cloud with a second template point cloud, to obtain a pose of the second stacking object.

The first template point cloud and the second template point cloud are determined in the following manner: Step 14011: acquiring, by the controller by using the sensor, original point clouds of a third stacking object and a fourth stacking object that meet an alignment pose standard; Step 14012: pre-processing, by the controller, the original point clouds, to obtain a standard point cloud of the third stacking object and a standard point cloud of the fourth stacking object; extracting, by the controller from the standard point cloud of the third stacking object, point clouds of a first corner structure region, a third corner structure region, a fifth corner structure region, and a seventh corner structure region of the third stacking object, and using the point clouds as the first template point cloud; and extracting, by the controller from the standard point cloud of the fourth stacking object, point clouds of a second corner structure region, a fourth corner structure region, a sixth corner structure region, and an eighth corner structure region of the fourth stacking object, and using the point clouds as the second template point cloud.

Step 1406: Determining, by the controller, a difference between the pose of the first stacking object and the pose of the second stacking object.

Step 1407: Determining, by the controller, whether the difference is less than a threshold.

Step 1408: When the difference is greater than or equal to the threshold, determining, by the controller, that an alignment relationship between the first stacking object and the second stacking object is not aligned, and generating, by the controller, a control instruction, to execute Step 1409.

Step 1409: Controlling, by the controller based on the difference, the material handling equipment to adjust a pose, and executing, by the controller, Step 1401 to Step 1407 until the difference is less than the threshold.

Step 1410: When the difference is less than the threshold, determining, by the controller, that an alignment state between the first stacking object and the second stacking object is aligned.

Step 1411: Controlling, by the controller, the material handling equipment to place the first stacking object onto the second stacking object, to complete stacking.

Closed-loop detection (corresponding to Step 1402 to Step 1411) refers to continuously performing pose detection on the first stacking object and the second stacking object after the material handling equipment picks up the first stacking object, comparing the difference between the detected pose of the first stacking object and the detected pose of the second stacking object with the threshold, determining that the alignment state is not aligned when the difference is greater than or equal to the threshold, continuously adjusting the pose of the first stacking object on the fork until the difference is less than the threshold, and controlling the material handling equipment to place the first stacking object onto the second stacking object, to complete stacking.

Figure 15:
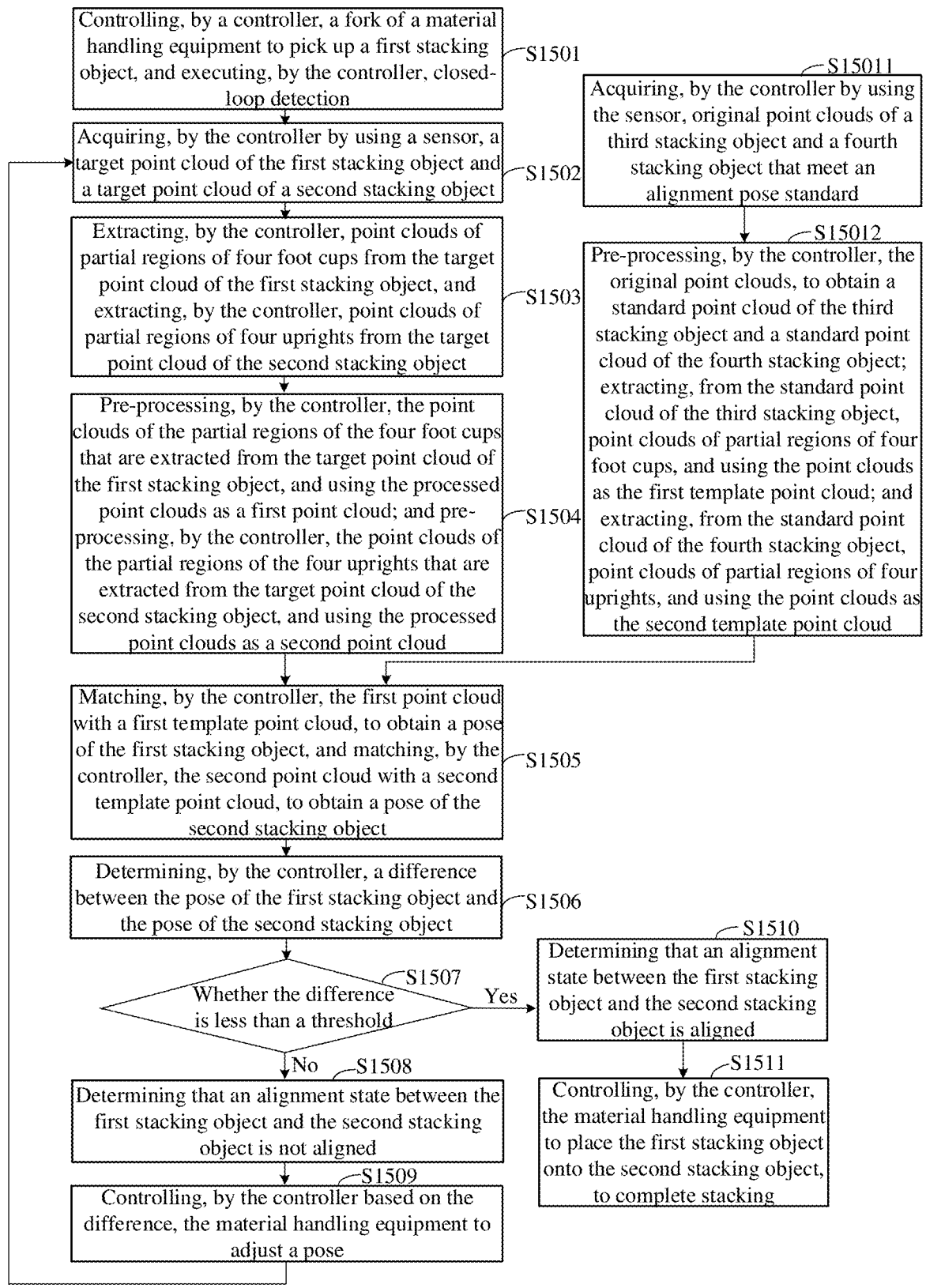
FIG. 15 is a flowchart of a method for determining an alignment state according to an embodiment of the present disclosure.

With reference to an actual application scenario, the following describes an implementation of a method proposed in embodiments of the present disclosure. As shown in FIG. 15, an execution body is material handling equipment, and a process of matching a foot cup of a first stacking object with an upright of a second stacking object is described as follows.

Step 1501: Controlling, by a controller, a fork of the material handling equipment to pick up the first stacking object, and executing, by the controller, closed-loop detection.

Step 1502: Acquiring, by the controller by using a sensor, a target point cloud of the first stacking object and a target point cloud of the second stacking object.

Step 1503: Extracting, by the controller, point clouds of partial regions of four foot cups from the target point cloud of the first stacking object, and extracting, by the controller, point clouds of partial regions of four uprights from the target point cloud of the second stacking object.

Step S1504: Pre-processing, by the controller, the point clouds of the partial regions of the four foot cups that are extracted from the target point cloud of the first stacking object, and using the processed point clouds as a first point cloud; and pre-processing, by the controller, the point clouds of the partial regions of the four uprights that are extracted from the target point cloud of the second stacking object, and using the processed point clouds as a second point cloud.

The point clouds of the partial regions of the four foot cups include a point cloud of a partial region of a first foot cup of the first stacking object, a point cloud of a partial region of a third foot cup of the first stacking object, a point cloud of a partial region of a fifth foot cup of the first stacking object, and a point cloud of a partial region of a seventh foot cup of the first stacking object.

The point clouds of the partial regions of the four uprights include a point cloud of a partial region of a second upright of the second stacking object, a point cloud of a partial region of a fourth upright of the second stacking object, a point cloud of a partial region of a sixth upright of the second stacking object, and a point cloud of a partial region of an eighth upright of the second stacking object.

Step 1505: Matching, by the controller, the first point cloud with a first template point cloud, to obtain a pose of the first stacking object, and matching, by the controller, the second point cloud with a second template point cloud, to obtain a pose of the second stacking object.

The first template point cloud and the second template point cloud are determined in the following manner: Step 15011: acquiring, by the controller by using the sensor, original point clouds of a third stacking object and a fourth stacking object that meet an alignment pose standard; Step 15012: pre-processing, by the controller, the original point clouds, to obtain a standard point cloud of the third stacking object and a standard point cloud of the fourth stacking object; extracting, by the controller from the standard point cloud of the third stacking object, point clouds of a partial region of a first foot cup, a partial region of a third foot cup, a partial region of a fifth foot cup, and a partial region of a seventh foot cup of the third stacking object, and using the point clouds as the first template point cloud; and extracting, by the controller from the standard point cloud of the fourth stacking object, point clouds of a partial region of a second upright, a partial region of a fourth upright, a partial region of a sixth upright, and a partial region of an eighth upright of the fourth stacking object, and using the point clouds as the second template point cloud.

Step 1506: Determining, by the controller, a difference between the pose of the first stacking object and the pose of the second stacking object.

Step 1507: Determining, by the controller, whether the difference is less than a threshold.

Step 1508: When the difference is greater than or equal to the threshold, determining, by the controller, that an alignment relationship between the first stacking object and the second stacking object is not aligned, and generating, by the controller, a control instruction, to execute Step 1509.

Step 1509: Controlling, by the controller based on the difference, the material handling equipment to adjust a pose, and executing, by the controller, Step 1501 to Step 1507 until the difference is less than the threshold.

Step 1510: When the difference is less than the threshold, determining, by the controller, that an alignment state between the first stacking object and the second stacking object is aligned.

Step 1511: Controlling, by the controller, the material handling equipment to place the first stacking object onto the second stacking object, to complete stacking.

Closed-loop detection (corresponding to Step 1502 to Step 1511) refers to continuously performing pose detection on the first stacking object and the second stacking object after the material handling equipment picks up the first stacking object, comparing the difference between the detected pose of the first stacking object and the detected pose of the second stacking object with the threshold, determined that the alignment state is not aligned when the difference is greater than or equal to the threshold, continuously adjusting the pose of the first stacking object on the fork until the difference is less than the threshold, and controlling the material handling equipment to place the first stacking object onto the second stacking object, to complete stacking.

FIG. 12 shows a second point cloud of a second stacking object B' and a second template point cloud of a fourth stacking object B before closed-loop detection (in this case, the second point cloud PC2 is not aligned with the second template point cloud TM2). FIG. 13 shows a second point cloud of a second stacking object B' and a second template point cloud of a fourth stacking object B that are aligned through closed-loop detection (in this case, the second point cloud PC2 is aligned with the second template point cloud TM2).

In this embodiment of the present disclosure, the controlling the material handling equipment to adjust the pose may include controlling the material handling equipment to adjust the pose of the first stacking object on the fork and/or controlling the material handling equipment to adjust a pose of a chassis (that is, adjust a pose of the material handling equipment relative to the second stacking object).

The foregoing method provided in this embodiment of the present disclosure may be applied to a plurality of application scenarios, including but not limited to an unmanned warehouse scenario or an unmanned loading and unloading scenario.

An unmanned warehouse may include an AGF, a storage rack, a picking station, an RCS (Reaction Control System), a WMS (Warehouse Management System), and the like.

The unmanned loading and unloading scenario includes an AGF, an RCS, and a truck.

According to specific embodiments provided in the present disclosure, the present disclosure discloses the following technical effects.

First, in the present disclosure, a controller extracts a first point cloud of a first target region of a first stacking object from a target point cloud of the first stacking object acquired by a sensor, extracts a second point cloud of a second target region of a second stacking object from a target point cloud of the second stacking object acquired by the sensor, matches the first point cloud with a first template point cloud, to obtain a pose of the first stacking object, matches the second point cloud with a second template point cloud, to obtain a pose of the second stacking object, and compares a difference between the pose of the first stacking object and the pose of the second stacking object with a threshold, to accurately determine an alignment state between the first stacking object and the second stacking object. In this manner, the difference between the pose of the first stacking object and the pose of the second stacking object can be determined in a stacking process, and the alignment state between the first stacking object and the second stacking object can be determined based on the difference and the threshold. By using this solution, impacts of an external environment (for example, uneven ground) and an error of material handling equipment may be prevented, and pose data of a first stacking object and a second stacking object may be accurately calculated, to determine an alignment state between the first stacking object and the second stacking object.

Second, in the present disclosure, the material handling equipment is dynamically controlled to adjust a pose based on the threshold and the difference between the pose of the first stacking object and the pose of the second stacking object. When the difference is greater than or equal to the threshold, it is determined that the alignment state is not aligned, and the material handling equipment is controlled to adjust the pose. The sensor re-acquires a target point cloud of the first stacking object and a target point cloud of the second stacking object, so that the controller re-determines a difference between a pose of the first stacking object and a pose of the second stacking object, to re-determine the alignment state until the difference is less than the threshold. This forms a closed-loop servo detection process. In this servo detection process, it is not required to stop running of material handling equipment.

Third, in the present disclosure, point cloud collection is performed on a third stacking object and a fourth stacking object that meet an alignment pose standard. Then, the first template point cloud and the second template point cloud may be respectively extracted from a standard point cloud of the third stacking object and a standard point cloud of the fourth stacking object. This does not require frequent size measurement and simplifies a data collection procedure. In addition, before the first template point cloud and the second template point cloud are respectively extracted from the standard point cloud of the third stacking object and the standard point cloud of the fourth stacking object, original point clouds of the third stacking object and the fourth stacking object that meet the alignment pose standard are pre-processed, to obtain the standard point cloud of the third stacking object and the standard point cloud of the fourth stacking object. In this way, accuracy and reliability of point clouds may be further improved.

Fourthly, in the present disclosure, a point cloud of at least one corner structure region of the third stacking object in the standard point cloud of the third stacking object is used as the first template point cloud; and/or, a point cloud of at least one corner structure region of the fourth stacking object in the standard point cloud of the fourth stacking object is used as the second template point cloud. This can ensure accuracy of a pose, can also reduce a processing volume during matching, thereby improving a matching speed, thus accelerating a speed of determining the alignment state between the first stacking object and the second stacking object.

Fifthly, in the present disclosure, a first target region of a first material cage at least includes at least one corner structure region of the first material cage or a partial region of at least one foot cup of the first material cage; and/or, a second target region of a second material cage at least includes at least one corner structure region of the second material cage or a partial region of at least one upright of the second material cage. These two manners may further reduce a processing volume during matching.

Certainly, any invention of the present disclosure is not necessarily required to achieve all of the advantages described above.

The foregoing describes specific embodiments of this specification. Other embodiments fall within the scope of the appended claims. In some cases, actions or steps recorded in the claims may be executed in an order other than those described in the embodiments, while still bringing desired results. In addition, the desired results do not require a process illustrated in the drawings to necessarily follow the shown specific order or sequential order. In some implementations, multitasking and parallel processing are also possible or may be advantageous.

According to another embodiment, a controller is provided, and the controller is configured to execute program instructions, to implement any method for determining an alignment state disclosed in embodiments of the present disclosure.

Embodiments in this specification are all described in a progressive manner, for same or similar parts in embodiments, mutual reference may be made. Each embodiment focuses on what is different from other embodiments. Especially, system embodiments or apparatus embodiments are basically similar to method embodiments, and therefore are described briefly; and for related parts, reference may be made to partial descriptions in the method embodiments. The system and apparatus embodiments described above are merely an example. The units described as separate parts may be or may not be physically separate, and parts displayed as units may be or may not be physical units, that is, may be located at one position, or may be distributed on a plurality of network units. Some or all of the modules may be selected according to an actual need to achieve the objectives of the solutions of the embodiments. A person of ordinary skill in the art may understand and implement embodiments of the present disclosure without creative efforts.

In addition, an embodiment of the present disclosure further provides a computer-readable storage medium, where the computer-readable storage medium stores a computer program. When the program is executed by a controller, steps of a method in any one of the foregoing method embodiments are implemented.

Material handling equipment is further provided, including: a material handling equipment body; a sensor, where the sensor is mounted on the material handling equipment body; and one or more controllers.

Program instructions, when being read and executed by the one or more controllers, execute steps of a method in any one of the foregoing method embodiments. For example, the controller includes a memory and a processor, and the memory is used to store the program instructions.

The present disclosure further provides a computer program product, including a computer program. When the computer program is executed by a controller, steps of a method in any one of the foregoing method embodiments are implemented.

Based on the foregoing descriptions of the implementations, a person skilled in the art may clearly understand that the present disclosure may be implemented by software in addition to a necessary universal hardware platform. Based on such an understanding, the technical solutions of the present disclosure essentially or the part contributing to the conventional technology may be embodied in the form of a computer program product. The computer program product may be stored in a storage medium, such as a ROM or RAM, a magnetic disk, or an optical disc.

The technical solutions provided in the present disclosure are described above in detail. The principles and implementations of the present disclosure are described herein by using specific examples. The descriptions of the above embodiments are merely provided to help understand the methods and core ideas of the present disclosure. In addition, a person of ordinary skill in the art can make variations to the present disclosure in terms of the specific implementations and application scopes according to the ideas of the present disclosure. In conclusion, the content of this specification should not be construed as a limitation of the present disclosure.

What is claimed is:

1. A material handling equipment, comprising a controller, wherein the controller is configured to execute program instructions, to implement the following steps:
   acquiring, by using a sensor, target point clouds of a first stacking object and a second stacking object;
   extracting, from the target point clouds, a first point cloud of a first target region of the first stacking object and a second point cloud of a second target region of the second stacking object;
   matching the first point cloud with a first template point cloud, to obtain a pose of the first stacking object, and matching the second point cloud with a second template point cloud, to obtain a pose of the second stacking object; and
   determining a difference between the pose of the first stacking object and the pose of the second stacking object, and comparing the difference with a threshold, to determine an alignment state between the first stacking object and the second stacking object,
   wherein the controller is further configured to execute the following steps:
   before determining the alignment state, controlling material handling equipment to move the first stacking object to a stacking preparation position, to complete a pre-alignment action relative to the second stacking object.

2. The material handling equipment according to claim 1, wherein the comparing the difference with the threshold, to determine the alignment state between the first stacking object and the second stacking object comprises:
   in a case that the difference is greater than or equal to the threshold, determining that the alignment state is not aligned; or
   in a case that the difference is less than the threshold, determining that the alignment state is aligned.

3. The material handling equipment according to claim 2, wherein the controller is further configured to execute the following steps:
   in a case that the alignment state is not aligned, controlling material handling equipment to adjust a pose;
   re-acquiring, by using the sensor, a target point cloud of the first stacking object and a target point cloud of the second stacking object;
   re-determining a difference between a pose of the first stacking object and a pose of the second stacking object; and
   re-determining, based on the difference, the alignment state until the difference is less than the threshold.

4. The material handling equipment according to claim 3, wherein the controlling the material handling equipment to adjust the pose comprises:
   controlling the material handling equipment to adjust a pose of a chassis or a pose of a fork.

5. The material handling equipment according to claim 2, wherein the controller is further configured to execute the following steps:
   in a case that the alignment state is aligned, controlling material handling equipment to place the first stacking object onto the second stacking object, to complete stacking.

6. The material handling equipment according to claim 2, wherein the controller is further configured to execute the following steps:
   counting a quantity of times of misalignment; and
   in a case that the quantity of times of misalignment is greater than a preset quantity of times of misalignment, outputting an alarm prompt.

7. The material handling equipment according to claim 1, wherein the first template point cloud and the second template point cloud are obtained in the following manner:
   collecting, by using the sensor, original point clouds of a third stacking object and a fourth stacking object that meet an alignment pose standard, a structure and a size of the third stacking object being the same as those of the first stacking object, and a structure and a size of the fourth stacking object being the same as those of the second stacking object;
   pre-processing the original point clouds, to obtain a standard point cloud of the third stacking object and a standard point cloud of the fourth stacking object;
   extracting the first template point cloud from the standard point cloud of the third stacking object; and
   extracting the second template point cloud from the standard point cloud of the fourth stacking object.

8. The material handling equipment according to claim 7, wherein the first template point cloud comprises a point cloud, extracted from the standard point cloud of the third stacking object, of a first corner structure region of the third stacking object; and
   the second template point cloud comprises a point cloud, extracted from the standard point cloud of the fourth stacking object, of a second corner structure region of the fourth stacking object.

9. The material handling equipment according to claim 8, wherein the first corner structure region has a first edge line and a third edge line, and the first edge line intersects the third edge line.

10. The material handling equipment according to claim 8, wherein the second corner structure region has a second edge line and a fourth edge line, and the second edge line intersects the fourth edge line.

11. The material handling equipment according to claim 8, wherein the first template point cloud further comprises a point cloud, extracted from the standard point cloud of the third stacking object, of a third corner structure region of the third stacking object; and
   the second template point cloud further comprises a point cloud, extracted from the standard point cloud of the fourth stacking object, of a fourth corner structure region of the fourth stacking object.

12. The material handling equipment according to claim 11, wherein the first template point cloud further comprises point clouds, extracted from the standard point cloud of the third stacking object, of a fifth corner structure region and a seventh corner structure region of the third stacking object; and the second template point cloud further comprises point clouds, extracted from the standard point cloud of the fourth stacking object, of a sixth corner structure region and an eighth corner structure region of the fourth stacking object.

13. The material handling equipment according to claim 12, wherein the first stacking object is a first material cage, and the second stacking object is a second material cage;

the first target region is located at a bottom of the first material cage, and the first target region comprises the first corner structure region of the first material cage, the third corner structure region of the first material cage, the fifth corner structure region of the first material cage, and the seventh corner structure region of the first material cage; and the second target region is located at a top of the second material cage, and the second target region comprises the second corner structure region of the second material cage, the fourth corner structure region of the second material cage, the sixth corner structure region of the second material cage, and the eighth corner structure region of the second material cage.

14. The material handling equipment according to claim 7, wherein the first template point cloud comprises a point cloud, extracted from the standard point cloud of the third stacking object, of a partial region of a first foot cup of the third stacking object; and the second template point cloud comprises a point cloud, extracted from the standard point cloud of the fourth stacking object, of a partial region of a second upright of the fourth stacking object.

15. The material handling equipment according to claim 14, wherein the first template point cloud further comprises a point cloud, extracted from the standard point cloud of the third stacking object, of a partial region of a third foot cup of the third stacking object; and the second template point cloud further comprises a point cloud, extracted from the standard point cloud of the fourth stacking object, of a partial region of a fourth upright of the fourth stacking object.

16. The material handling equipment according to claim 15, wherein the first template point cloud further comprises point clouds, extracted from the standard point cloud of the third stacking object, of partial regions of a fifth foot cup and a seventh foot cup of the third stacking object; and the second template point cloud further comprises point clouds, extracted from the standard point cloud of the fourth stacking object, of partial regions of a sixth upright and an eighth upright of the fourth stacking object.

17. The material handling equipment according to claim 16, wherein the first stacking object is a first material cage, and the second stacking object is a second material cage;

the first target region comprises the first foot cup of the first material cage, the third foot cup of the first material cage, the fifth foot cup of the first material cage, and the seventh foot cup of the first material cage; and the second target region comprises the second upright of the second material cage, the fourth upright of the second material cage, the sixth upright of the second material cage, and the eighth upright of the second material cage.

18. A controller, wherein the controller is configured to execute program instructions, to implement the following steps:

acquiring, by using a sensor, target point clouds of a first stacking object and a second stacking object;

extracting, from the target point clouds, a first point cloud of a first target region of the first stacking object and a second point cloud of a second target region of the second stacking object;

matching the first point cloud with a first template point cloud, to obtain a pose of the first stacking object, and matching the second point cloud with a second template point cloud, to obtain a pose of the second stacking object; and determining a difference between the pose of the first stacking object and the pose of the second stacking object, and comparing the difference with a threshold, to determine an alignment state between the first stacking object and the second stacking object, wherein the controller is further configured to execute the following steps:

before determining the alignment state, controlling material handling equipment to move the first stacking object to a stacking preparation position, to complete a pre-alignment action relative to the second stacking object.

19. A method for determining an alignment state, comprising:

acquiring, by using a sensor, target point clouds of a first stacking object and a second stacking object;

extracting, from the target point clouds, a first point cloud of a first target region of the first stacking object and a second point cloud of a second target region of the second stacking object;

matching the first point cloud with a first template point cloud, to obtain a pose of the first stacking object, and matching the second point cloud with a second template point cloud, to obtain a pose of the second stacking object; and determining a difference between the pose of the first stacking object and the pose of the second stacking object, and comparing the difference with a threshold, to determine an alignment state between the first stacking object and the second stacking object, wherein the method further comprises:

before determining the alignment state, controlling material handling equipment to move the first stacking object to a stacking preparation position, to complete a pre-alignment action relative to the second stacking object.

* * * * *